(12) United States Patent
Tanzil et al.

(10) Patent No.: US 12,456,995 B2
(45) Date of Patent: *Oct. 28, 2025

(54) MULTIBAND DIGITAL PRE-DISTORTER WITH REDUCED DIMENSION REQUIREMENTS

(71) Applicant: Telefonaktiebolaget LM Ericsson (publ), Stockholm (SE)

(72) Inventors: S M Shahrear Tanzil, Ottawa (CA); Ashim Biswas, Sollentuna (SE); Leonard Rexberg, Hässelby (SE); Yuecheng Yang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 71 days.

This patent is subject to a terminal disclaimer.

(21) Appl. No.: 18/287,681

(22) PCT Filed: Apr. 22, 2021

(86) PCT No.: PCT/SE2021/050369
§ 371 (c)(1),
(2) Date: Oct. 20, 2023

(87) PCT Pub. No.: WO2022/225429
PCT Pub. Date: Oct. 27, 2022

(65) Prior Publication Data
US 2024/0364372 A1 Oct. 31, 2024

(51) Int. Cl.
*H04B 1/04* (2006.01)
*H03F 1/32* (2006.01)

(52) U.S. Cl.
CPC .......... *H04B 1/0475* (2013.01); *H03F 1/3241* (2013.01); *H04B 2001/0425* (2013.01)

(58) Field of Classification Search
CPC .......... H04B 1/0475; H04B 2001/0425; H03F 1/3241
(Continued)

(56) References Cited

U.S. PATENT DOCUMENTS 6,798,843 B1 * 9/2004 Wright ................. H03F 1/3247
330/149
10,673,475 B1 * 6/2020 Zhuo .................... H04B 7/0617
(Continued)

FOREIGN PATENT DOCUMENTS

EP          3 301 817 A1    4/2018
WO          2019/043434 A1  3/2019
(Continued)

OTHER PUBLICATIONS

U.S. Appl. No. 18/279,842 (Year: 2021).*
(Continued)

*Primary Examiner* — Kevin M Burd
(74) *Attorney, Agent, or Firm* — Rothwell, Figg, Ernst & Manbeck, P.C.

(57) ABSTRACT

There is provided mechanisms for operating a DPD for an access node. A method comprises receiving a plurality of input signals, each from a respective frequency band, wherein each signal is of memory order M. The method comprises, for each frequency band $l=1, \ldots, B$ of the frequency bands, generating a plurality of pre-distorted signals for the frequency band/based on the plurality of input signals coming from all the B frequency bands and using LUTs, according to which there is one LUT structure with LUT-based transforms per each combination of frequency band $l=1, \ldots, B$ and memory order $m=0, \ldots, M$, wherein each of the LUT structures comprises combinations of LUTs of at most dimension $B-q$, where $1 \leq q \leq B$. The method comprises, for each frequency band $l=1, \ldots, B$ of the
(Continued)

frequency bands, combining the plurality of pre-distorted signals for the frequency band to provide a combined pre-distorted signal for the frequency band.

20 Claims, 17 Drawing Sheets

(58) Field of Classification Search
USPC .......................................................... 375/297
See application file for complete search history.

(56) References Cited

U.S. PATENT DOCUMENTS

| 2014/0050281 | A1* | 2/2014 | Chen | H03F 1/3247 |
| | | | | 375/296 |
| 2014/0347126 | A1 | 11/2014 | Laporte et al. | |
| 2020/0021253 | A1 | 1/2020 | Ghannouchi et al. | |

FOREIGN PATENT DOCUMENTS

| WO | 2022/071837 A1 | 4/2022 |
| WO | 2022/185093 A1 | 9/2022 |

OTHER PUBLICATIONS

International Search Report and Written Opinion issued in International Application No. PCT/SE2021/050369 Dec. 16, 2021 (11 pages).
Dalbah, A. I. et al., "Hybrid Look-Up-Tables Based Behavioral Model for Dynamic Nonlinear Power Amplifiers", IEEE Access, vol. 8, Feb. 2020 (10 pages).
Quindroit, C. et al., "FPGA Implementation of Orthogonal 2D Digital Predistortion System for Concurrent Dual-Band Power Amplifiers Based on Time-Division Multiplexing", IEEE Transactions on Microwave Theory and Techniques, vol. 61, No. 12, Dec. 2013 (9 pages).
Johnson, E. L. et al., "A Digital Quarter Square Multiplier", IEEE Transactions on Computers, vol. c-29, No. 3, Mar. 1980 (4 pages).
Ding, L. et al., "Concurrent Dual-band Digital Predistortion", IEEE, 2012 (3 pages).
Pham, T., "Contribution to Dimensionality Reduction of Digital Predistorter Behavioral Models for RF Power Amplifier Linearization", Universitat Politecnica de Catalunya, Ph.D. Thesis, Barcelona, Nov. 6, 2019 (144 pages).

* cited by examiner

MULTIBAND DIGITAL PRE-DISTORTER WITH REDUCED DIMENSION REQUIREMENTS

CROSS REFERENCE TO RELATED APPLICATIONS

This application is a 35 U.S.C. § 371 National Stage of International Patent Application No. PCT/SE2021/050369, filed 2021 Apr. 22.

TECHNICAL FIELD

Embodiments presented herein relate to a method, a digital pre-distorter, a computer program, and a computer program product for operating the digital pre-distorter for an access node.

BACKGROUND

For a wideband High-Power Amplifier (HPA) with Instantaneous Bandwidth (IBW) of, e.g., 1 Gigahertz (GHz) or above, it has been observed that traditional Lookup Table (LUT) based methods for linearization are excessively costly because of higher sample rate requirements. It has been observed that even with higher sample rates, LUT based methods for linearization are unable to reach the desired Adjacent Channel Leakage Ratio (ACLR) performance. Separate Digital Predistortion (S-DPD), which is also known as frequency selective Digital Predistortion (DPD), treats each linearization region separately. S-DPD not only offers low sample rate operations but also can reach desired ACLR performance levels.

The basic idea of S-DPD is to formulate a multivariate Generalized Memory Polynomial (GMP) or just Memory Polynomial (MP) for each linearization region and estimate corresponding coefficients independently. Typically, each linearization region covers a transmission frequency band. As such, the terms linearization region and frequency band are used interchangeably herein. After estimating the coefficients for the linearization regions, a portion of each of the S-DPD polynomials can be quantized to a multidimensional LUT. This is usually done by forming either a uniform or non-uniform multidimensional grid of points over the range of inputs, followed by evaluation of the S-DPD polynomials at the grid points. These evaluated points are stored as LUT outputs for each combination of inputs. Using the multidimensional LUT for the S-DPD actuator (or DPD forward calculation) makes it much faster and economical compared to evaluating the polynomial. This approach is known as hybrid LUTs (hereinafter denoted H-LUTs) and has proven a cost-effective solution for multiband implementation (see, e.g., Christophe Quindroit, Naveen Naraharisetti, Patrick Roblin, Shahin Gheitanchi, Volker Mauer, Mike Fitton, "FPGA Implementation of Orthogonal 2D Digital Predistortion System for Concurrent Dual-Band Power Amplifiers Based on Time-Division Multiplexing", IEEE TRANSACTIONS ON MICROWAVE THEORY AND TECHNIQUES, VOL. 61, NO. 12, December 2013, p. 4591-4599). For instance, a triple band system will have a 3-dimensional H-LUT for each of its bands.

As the number of bands increases beyond two, there is an inherent problem with the above-mentioned H-LUTs. The memory requirements grow exponentially and make implementation costly. For B bands with M memory taps and K bins per band case, for each separate DPD the total memory requirements in the H-LUT would be $M \cdot K^B$. Previous attempts to replace all multivariate monomials with powers of additive terms to reduce a multidimensional problem to a single dimension one and significantly reduced memory requirements, however, suffer from performance degradation.

Hence, there is still a need for an improved multiband wideband DPD.

SUMMARY

An object of embodiments herein is to address the above issues and provide a DPD for an access node that does not suffer from the above issues, or at least where the above issues are reduced or mitigated.

According to a first aspect there is presented a method for operating a DPD for an access node. The method comprises receiving a plurality of input signals, each from a respective frequency band, wherein each signal is of memory order M. The method comprises, for each frequency band $l=1, \ldots, B$ of the frequency bands, generating a plurality of pre-distorted signals for the frequency band l based on the plurality of input signals coming from all the B frequency bands and using LUTs, according to which there is one LUT structure with LUT-based transforms per each combination of frequency band $l=1, \ldots, B$ and memory order $m=0, \ldots, M$, wherein each of the LUT structures comprises combinations of LUTs of at most dimension B–q, where $1 \leq q < B$. The method comprises, for each frequency band $l=1, \ldots, B$ of the frequency bands, combining the plurality of pre-distorted signals for the frequency band to provide a combined pre-distorted signal for the frequency band.

According to a second aspect there is presented a DPD for an access node. The DPD comprises processing circuitry. The processing circuitry being is to cause the DPD to receive a plurality of input signals, each from a respective frequency band, wherein each signal is of memory order M. The processing circuitry being is to cause the DPD to, for each frequency band $l=1, \ldots, B$ of the frequency bands, generate a plurality of pre-distorted signals for the frequency band l based on the plurality of input signals coming from all the B frequency bands and using LUTs, according to which there is one LUT structure with LUT-based transforms per each combination of frequency band $l=1, \ldots, B$ and memory order $m=0, \ldots, M$, wherein each of the LUT structures comprises combinations of LUTs of at most dimension B–q, where $1 \leq q < B$. The processing circuitry being is to cause the DPD to, for each frequency band $l=1, \ldots, B$ of the frequency bands, combine the plurality of pre-distorted signals for the frequency band to provide a combined pre-distorted signal for the frequency band.

According to a third aspect there is presented a DPD for an access node. The DPD comprises a receive module configured to receive a plurality of input signals, each from a respective frequency band, wherein each signal is of memory order M. The DPD comprises a generate module configured to, for each frequency band $l=1, \ldots, B$ of the frequency bands, generate a plurality of pre-distorted signals for the frequency band l based on the plurality of input signals coming from all the B frequency bands and using Look-Up Tables, LUTs, according to which there is one LUT structure with LUT-based transforms per each combination of frequency band $l=1, \ldots, B$ and memory order $m=0, \ldots, M$, wherein each of the LUT structures comprises combinations of LUTs of at most dimension B–q, where $1 \leq q < B$. The DPD comprises a combine module configured to, for each frequency band $l=1, \ldots, B$ of the frequency bands, combine the plurality of pre-distorted signals for the frequency band to provide a combined pre-distorted signal for the frequency band.

According to a fourth aspect there is presented a computer program for operating a DPD for an access node, the computer program comprising computer program code which, when run on a DPD, causes the DPD to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable the multidimensional problem to be reduced to a single dimension one and enables a significant reduction in memory requirements, without suffering from performance degradation.

Advantageously, these aspects minimize the memory requirement associated with multi-dimensional H-LUTs whilst keeping the performance the same as for multidimensional H-LUTs.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc."
are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for an improved multiband wideband DPD.

The embodiments disclosed herein therefore relate to mechanisms for operating a DPD for an access node. In order to obtain such mechanisms there is provided a DPD, a method performed by the DPD, a computer program product comprising code, for example in the form of a computer program, that when run on a DPD, causes the DPD to perform the method.

Typical DPD architectures require B-dimension LUTs to support B frequency bands. Instead of B-dimension LUTs, one proposed DPD architecture utilizes several (B−q)-dimension LUTs, where q≥1. One goal of the herein disclosed embodiments is to construct a mathematical equivalent of the multi-dimensional DPD architectures using a change of basis technique that supports (B−q)-dimension LUTs. As a result, the proposed DPD architectures perform the same as the multi-dimensional DPD architectures whilst reducing the dimension requirements of the DPD, resulting in lower memory requirements of the DPD. Additionally, each of the (B−q)-dimension LUTs is independent from one another and hence can be implemented in parallel. One proposed DPD architecture reduces the dimension even further and only uses several one-dimensional LUTs.

Figure 1:
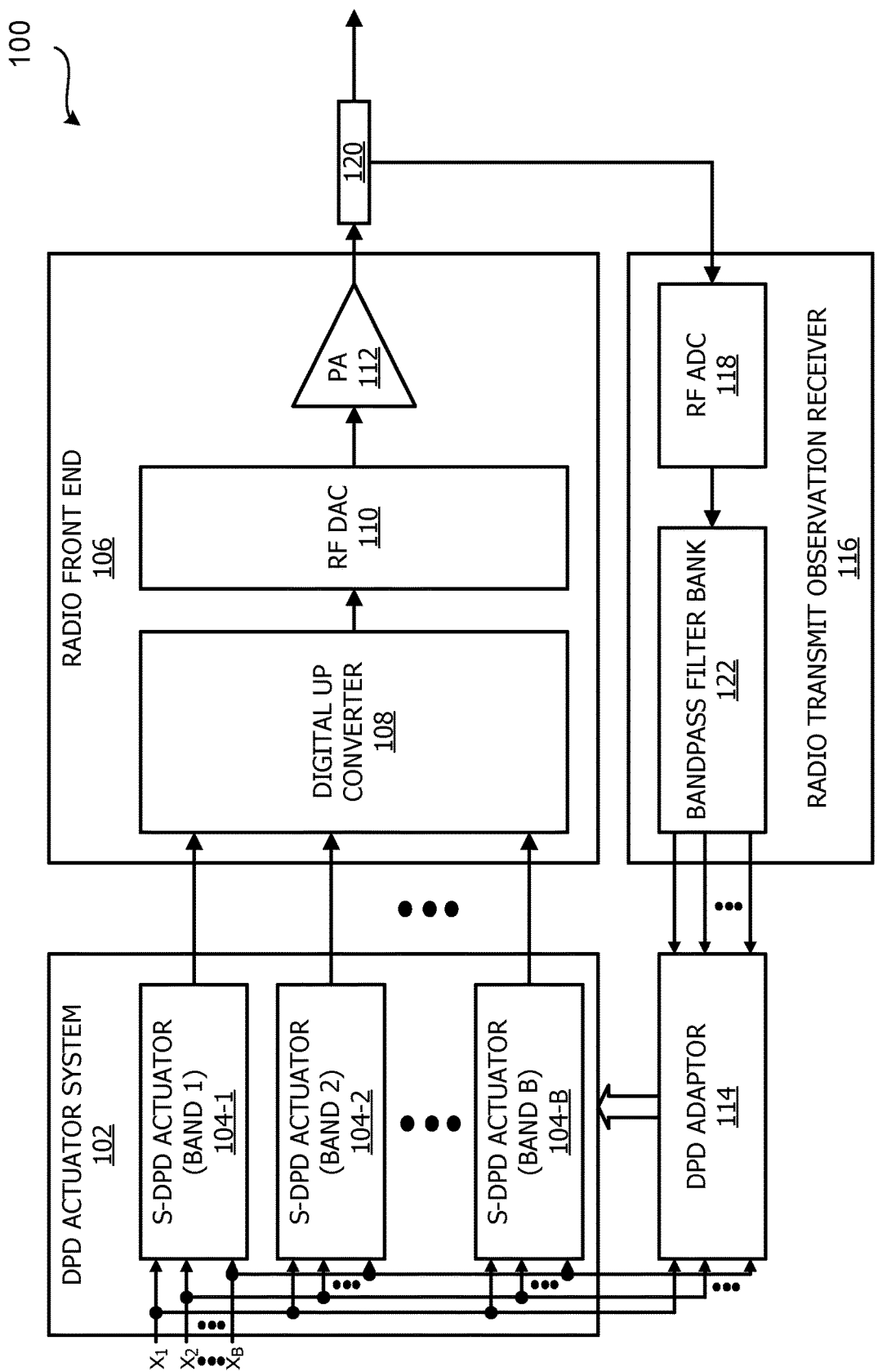
FIG. 1 illustrates a radio node that includes a typical S-DPD.

Before describing embodiments of the present disclosure, it is beneficial to first describe an S-DPD. In this regard, FIG. 1 illustrates a radio node 100 that includes a DPD system 102 that uses an S-DPD architecture. As illustrated, the DPD system 102 includes multiple S-DPD actuators 104-1 through 104-B for B respective frequency bands ($b_1, \ldots, b_B$), where B is greater than or equal to 2. As discussed below in detail, each S-DPD actuator 104-1 (for the 1-th frequency band) receives input signals ($x_1, \ldots, x_B$) (i.e., complex baseband input signals) for the B frequency bands and generates a predistorted signal for the 1-th frequency band based on the received input signals ($x_1, \ldots, x_B$) and a S-DPD actuator mechanism (e.g., memory polynomial or LUT scheme). In this example, the predistorted signals for the B frequency bands are processed by a radio unit 106 of the radio unit 100 to provide a radio frequency (RF) signal for transmission. Specifically, in this example, the predistorted signals for the B frequency bands are digitally upconverted by a digital upconverter 108, converted to analog by an RF digital-to-analog converter (DAC) 110, and amplified by a power amplifier (PA) 112.

As will be appreciated by those of skill in the art, the S-DPD actuators 104-1 through 104-B are trained by a DPD adaptor 114 based on the input signals ($x_1, \ldots, x_B$) and feedback signals for the B frequency bands received via a radio transmit observation receiver (TOR) 116. In this example, the TOR 116 includes an RF analog-to-digital converter (ADC) 118 coupled to an output of the PA 112 via a coupler 120 and a bandpass filter bank 122 that filters the output of the RF ADC 118 to provide the feedback signals (i.e., complex baseband feedback signals) for the B frequency bands. Note that both the radio front end 106 and the TOR 116 may include additional or alternative component that are not illustrated in FIG. 1, as will be appreciated by those of ordinary skill in the art.

The operation of the S-DPD actuators 104-1 through 104-B is described below in terms of a memory polynomial (MP); however, one can easily extend the formulation for different variants of Volterra series such as a Generalized Memory Polynomial (GMP). Let us use $x_l(n)$ to represent input signals (i.e., input samples), where $l \in (1, B)$ represents the frequency band index. The output signal (i.e., output samples) from the l-th S-DPD 104-1 is denoted by $z_l(n)$. Note that n refers to a time-index. The maximum non-linear order of the S-DPD 104-1 is denoted by P. Memory taps are denoted by the set $\mathbb{Q} = \{Q_0, Q_1, Q_2, \ldots, Q_M\}$ with $Q_0=0$. The cardinality of $\mathbb{Q}$ is M+1.

The output from the S-DPD actuator 104-1 can be written as in Equation (1).

$$z_l(n) = x_l(n) + \sum_{m=0}^{M} x_l(n - Q_m) \sum_{p_1=0}^{P-1} \tag{1}$$

$$\sum_{p_2=0}^{p_1} \cdots \sum_{p_B=0}^{p_{B-1}} a_{l,m,p_1,p_2,\ldots,p_B} \prod_{b=1}^{B} |x_b(n - Q_m)|^{(p_b - p_{b+1})}$$

Here, $\alpha_{l,m,p_1,p_2,\ldots,p_B}$ refers to the S-DPD coefficients and $p_1=(0,(P-1))$, with the restriction $P_{b+1} \in (0, p_b)$ and $p_{B+1}=0$. Equation (1) captures that the non-linear modelling of the inverse of the PA 112 (i.e., the predistortion) can be performed by considering the current and past samples. Past samples are included because of memory effects inherent in electronic devices. The nonlinearity of the PA 112 creates intermodulation frequencies and that is modelled by the B multiplicative terms and exponents $p_b$ in Equation (1). When memory and non-linearities are both absent, Equation (1) becomes simpler i.e., $z_l(n) = x_l(n)$. Please note that there are B S-DPD actuators 104-1 through 104-B, and the description of the l-th S-DPD actuator 104-l is applicable of the S-DPD actuators 104-1 through 104-B.

It is also possible to use generalized memory polynomial as presented in Equation (1a) where $Q_v$ represents the cross-memory taps and $v \in (-V_1, +V_2)$:

$$z_l(n) = x_l(n) + \sum_{v=-V_1}^{V_2} \sum_{m=0}^{M} x_l(n - Q_m) \sum_{p_1=0}^{P-1} \sum_{p_2=0}^{p_1} \cdots \tag{1a}$$

$$\sum_{p_B=0}^{p_{B-1}} a_{l,m,p_1,p_2,\ldots,p_B} \prod_{b=1}^{B} |x_b(n - Q_m - Q_v)|^{(p_b - p_{b+1})}$$

When $v=0$, Equation (1a) is a memory polynomial. The herein disclosed embodiments are applicable also for different variants of the Volterra series and the herein disclosed embodiments can be extended to other variants of the Volterra series. Therefore, the herein disclosed embodiments will be described using only the memory polynomial to improve readability.

As known to those of ordinary skill in the art, the DPD adaptor 114 can use the least square or other adaptive methods to identify S-DPD coefficients. In the S-DPD actuators 104-1 through 104-B, one can use either polynomial based approach as in Equation (1) or use variants of a LUT based approach as in Equation (1a) or as described below.

There are several LUT based approaches that can be possible. One option is to use a traditional LUT both in both the DPD adaptor 114 and the S-DPD actuators 104-1 through 104-B. This technique is referred to as a multi-dimensional LUT based approach. However, this technique is cumbersome when there are more than two frequency bands (i.e., when B>2), especially in the S-DPD actuators 104-1 through 104-B because of the excessive amount of memory required for storing multi-dimensional LUTs. Here, a H-LUT approach is considered, which is best suitable for the multiband case. The H-LUT architecture for the S-DPD actuator 104-1 is illustrated at 200 in FIG. 2. As can be seen from FIG. 2, Equation (1) is precomputed at various points of the complete range of input signals and the results are stored in the dynamic memory of the hardware; hence, the S-DPD actuator 104-1 requires a lower number of computations at runtime.

Figure 2:
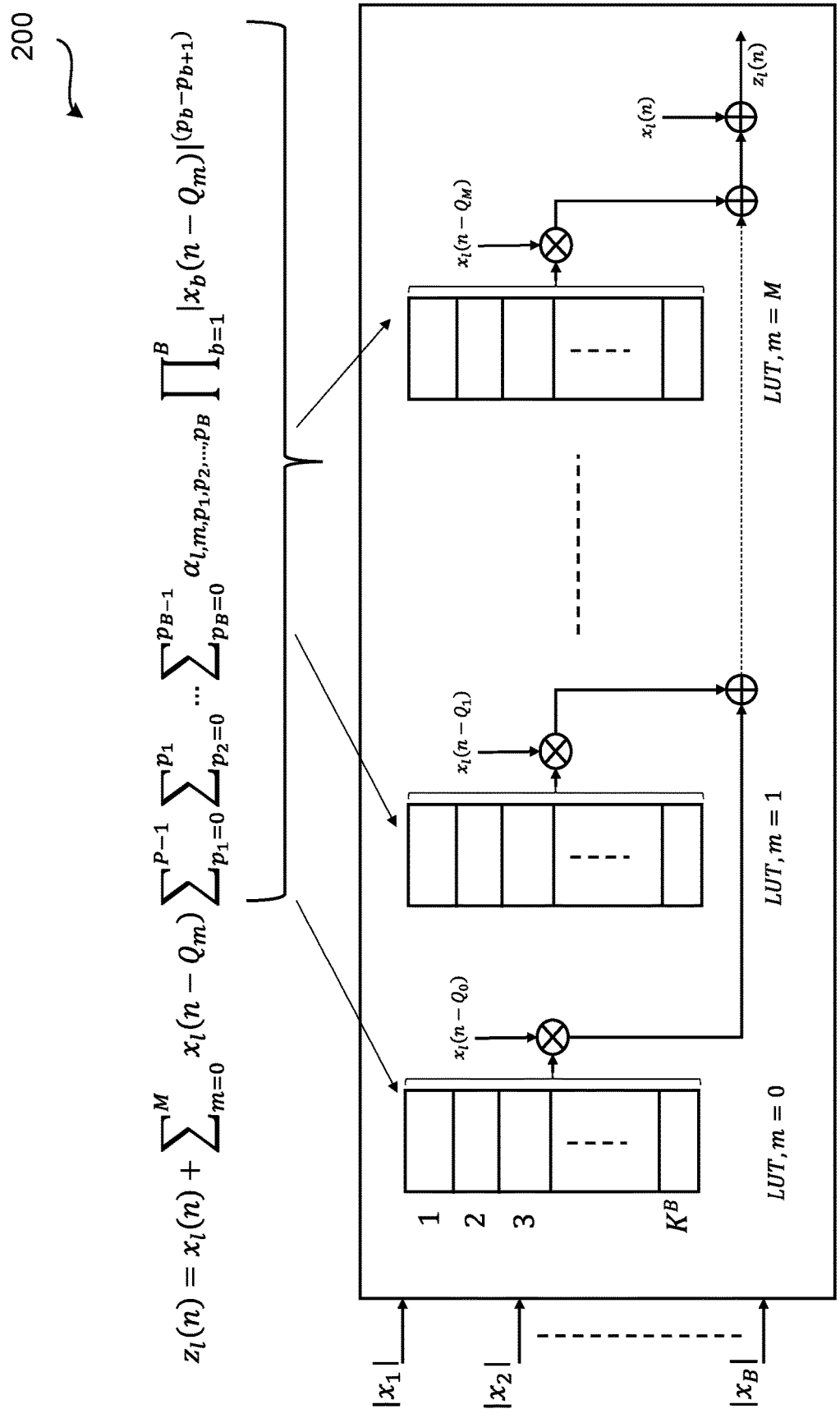
FIG. 2 illustrates an exemplary H-LUT based on a memory polynomial architecture for the S-DPD of FIG. 1.

As shown in FIG. 2, at 200 there are M+1 H-LUTs for the S-DPD actuator 104-l, each considering B-inputs that are $\{|x_1|, |x_2|, \ldots, |x_B|\}$ and assuming the range of $|x_l|$ is divided into K parts. The division can be done taking statistical distribution of $|x_l|$ into consideration, like using usual companding methods such as, e.g., A-law or Mu-law used to compress a large dynamic range to more practical limits, or can be done uniformly in which case the size of each interval would be $$\frac{\max(|x_l|) - \min(|x_l|)}{K - 1}.$$

Figure 3:
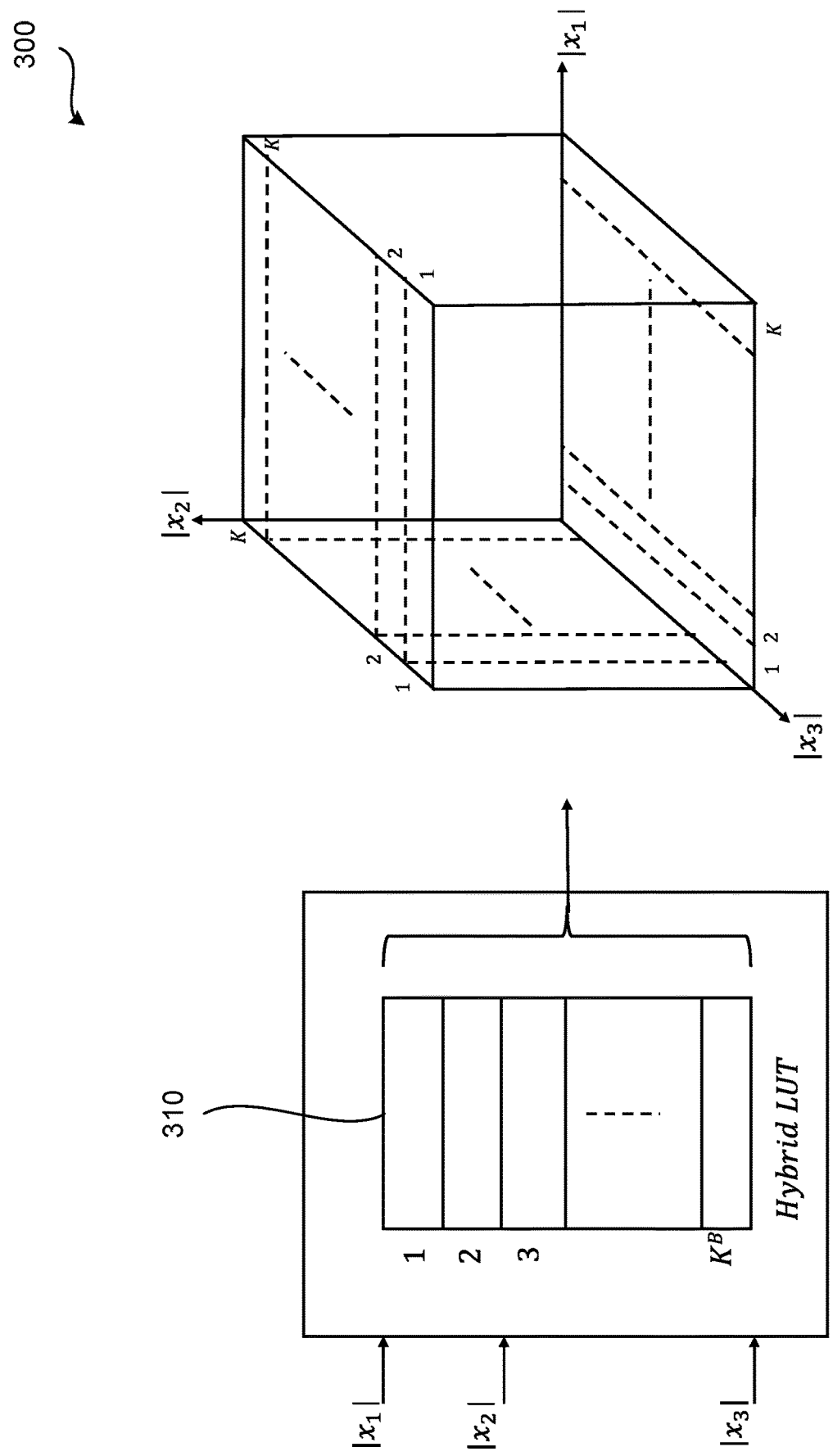
FIG. 3 illustrates an example of the H-LUT of FIG. 2 in which there is a single H-LUT for a triple band case without memory taps.

The size of each H-LUT is $K^B$, and there are M+1 H-LUTs corresponding to the memory taps for each l-th band. FIG. 3 at 300 illustrates an example of the H-LUT architecture of Fig-2 in which there is a single H-LUT 310 for a triple band case without memory taps (i.e., M=0).

Proposed S-DPD Architectures

Next will be disclosed proposed modifications to the S-DPD architecture. As noted above, B dimension H-LUTs are needed to support B frequency bands. One goal of the proposed modification is to reduce the dimension of the H-LUT without causing any performance degradation. Specifically, with reference again to FIG. 2, part of the basis function, S, is to be restructured in such a way so that a new basis function, denoted $\tilde{S}$, operates on lower dimension input address entries.

Two non-limiting illustrative examples are provided to how such a lower dimension basis function can be constructed. As the skilled person would appreciate, these examples can be extended to multiband cases by induction. The examples assume a dual frequency band case where $x_1$ and $x_2$ are input signals. Here, $x_1$ and $x_2$ are column vectors with length $$L \geq \sum_{r=1}^{P} \binom{B+r-2}{r-1}.$$

If the length is less than this value, the system will be underdetermined.

Example 1: Without memory and for P=3, the S-DPD output for the l:th band can be expressed as in Equation (C1a).

$$z_1 = x_1 + x_1[\alpha_1 + \alpha_2|x_1| + \alpha_3|x_2| + \alpha_4|x_1||x_2| + \alpha_5|x_1|^2 + \alpha_6|x_2|^2] \quad \text{(C1a)}$$

Here $z_1$ is the S-DPD output (column vector) for frequency band 1 and vector length L. According to quarter square method, multiplication of two real number can be written as:

$$|x_1||x_2| = \frac{1}{2}\{(|x_1| + |x_2|)^2 - |x_1|^2 - |x_2|^2\} \quad \text{(C1b)}$$

Therefore, the S-DPD output can be rewritten substituting Equation (C1b) in Equation (C1a) as follows:

$$z_1 = x_1 + x_1\left[\alpha_1 + \alpha_2|x_1| + \alpha_3|x_2| + \frac{1}{2}\alpha_4\{(|x_1| + |x_2|)^2 - |x_1|^2 - |x_2|^2\} + \alpha_5|x_1|^2 + \alpha_6|x_2|^2\right] \quad \text{(C1c)}$$

With $S=[1_L|x_1|\ [x_2|\ |x_1||x_2|\ |x_1|^2|x_2|^2]$ it follows that $z_1 = x_1 + x_1 S\alpha$, where $\alpha = [\alpha_1\ \alpha_2\ \alpha_3\ \alpha_4\ \alpha_5\ \alpha_6]^T$. $1_L$ refers to a column vector of length L where all the entries are one. The new lower dimension basis function can then be expressed as:

$$\tilde{S} = \left[1_L\ |x_1|\ |x_2|\ \frac{1}{2}\{(|x_1| + |x_2|)^2 - |x_1|^2 - |x_2|^2\}\ |x_1|^2\ |x_2|^2\right] \quad \text{(C1d)}$$

which is mathematically equivalent to S and $z_1 = x_1 + x_1\tilde{S}\alpha$.

Example 2: When P=4, the S-DPD output for the l-th band can be expressed (using Equation (1)) as:

$$z_1 = x_1 + x_1[\alpha_1 + \alpha_2|x_1| + \alpha_3|x_2| + \alpha_4|x_1||x_2| + \alpha_5|x_1|^2 + \alpha_6|x_2|^2 + \alpha_7|x_1|^2|x_2| + \alpha_8|x_1||x_2|^2 + \alpha_9|x_1|^3 + \alpha_{10}|x_2|^3]. \quad \text{(C2a)}$$

Using the same analogy as above:

$$|x_1|^2|x_2| = \frac{1}{6}[(|x_1| + |x_2|)^3 - (|x_1| - |x_2|)^3 - 2|x_2|^3] \quad \text{(C2b)}$$

$$|x_1||x_2|^2 = \frac{1}{6}[(|x_1| + |x_2|)^3 + (|x_1| - |x_2|)^3 - 2|x_1|^3] \quad \text{(C2c)}$$

In Equations (C2b) and (C2c) two different types of replacement for $|x_1|^2|x_2|$ and $|x_1||x_2|^2$ were used so that these two terms are distinguishable during the adaptation and do not face ill condition problems. Therefore, the new lower dimension basis function can be expressed as:

$$\tilde{S} = \left[1_L|x_1||x_2|\frac{1}{2}\{(|x_1| + |x_2|)^2 - |x_1|^2 - |x_2|^2\}\right. \quad \text{(C2d)}$$

$$|x_1|^2|x_2|^2 \ldots \frac{1}{6}[(|x_1| + |x_2|)^3 - (|x_1| - |x_2|)^3 - 2|x_1|^3] \ldots$$

$$\left.\frac{1}{6}[(|x_1| + |x_2|)^3 - (|x_1| - |x_2|)^3 - 2|x_1|^3] \ldots |x_1|^3|x_2|^3\right]$$

In the above two examples, $\tilde{S}$ operates on one-dimension inputs (that is, either $|x_1|$ or $|x_2|$ or linear combination of them) whilst S operates on two-dimension inputs (e.g., the product of $|x_1|$ and $|x_2|$). Using the above-mentioned examples it is possible to show that lower dimension basis functions can be constructed for B frequency bands and non-linear order P.

Design Criteria for Lower Dimension Basis Function

One goal of the herein disclosed embodiments is to structure the generation of the new lower dimension basis functions in a way so that the memory requirement of the DPD is reduced when implemented with LUTs. Using the second example, the new lower basis function can be rewritten as follows:

(C2e)

$$\tilde{S} = \left[1_L\ |x_1|\ |x_2|\ (|x_1| + |x_2|)^2\ |x_1|^2\ |x_2|^2\ (|x_1| + |x_2|)^3\ (|x_1| - |x_2|)^3\ |x_1|^3\ |x_2|^3\right]$$

The S-DPD output $z_1 = x_1 + x_1\tilde{S}\beta$, where $\beta$ represents a new set of S-DPD coefficients for the new basis function, and where $S\alpha = \tilde{S}\beta$. Further:

(C2f)

$$z_1 = x_1 + x_1\{H_1(|x_1|, \beta) + H_2(|x_2|, \beta) + H_3(|x_1| + |x_2|, \beta) + H_4(|x_1| - |x_2|, \beta)\}$$

where $$H_1(|x_1|, \beta) = \beta_1 + \beta_2|x_1| + \beta_5|x_1|^2 + \beta_9|x_1|^3,$$

$$H_2(|x_2|, \beta) = \beta_3|x_2| + \beta_6|x_2|^2 + \beta_{10}|x_2|^3,$$

$$H_3(|x_1| + |x_2|, \beta) = \beta_4(|x_1| + |x_2|)^2 + \beta_7(|x_1| + |x_2|)^3,$$

and $$H_4(|x_1| - |x_2|, \beta) = \beta_8(|x_1| - |x_2|)^3.$$

With reference to the above two examples, design criteria for the DPD can be set as follows.

For the same power terms, such as $|x_1|^2|x_2|$ and $|x_1||x_2|^2$, two different types of the new terms are needed to adapt them correctly and yield unique solutions. A different set of weights $w_1$, $w_2$ can be used with $(w_1|x_1| + w_2|x_2|)^3$ to compensate $|x_1|^2|x_2|$ and $|x_1||x_2|^2$, where $w_1$, $w_2$ can be any real number. For example, in the case of the Example 2, it is possible to use $w_1=1$, $w_2=1$ and $(|x_1|+|x_2|)^3$ to compensate $|x_1|^2|x_2|$, whereas it is possible to use $w_1=1$, $w_2=-1$ and $(|x_1|-|x_2|)^3$ to compensate $|x_1||x_2|^2$. So, for B frequency bands, to replace p power terms, a different set of weights can be used and use $(w_1|x_1|+w_2|x_2|+ \ldots +w_B|x_B|)^p$ to replace corresponding terms.

The same address entry terms can be stored together to reduce memory requirements. As an example, the terms $(|x_1|+|x_2|)^2$ and $(|x_1|+|x_2|)^3$ can be stored in the same H-LUT. Therefore, when designing different terms, the number of possible weight sets could be restricted.

Following the above criteria, higher dimension terms can be traded with lower dimension terms. Next it will be demonstrated that the lower dimension basis function does not face divergence during the adaptation. Assume therefore that the new basis function is a linear transformation of the original basis function i.e., $S=\tilde{S}R$, where R is a relationship matrix and $R=\tilde{S}^{-1} S$ where $(.)^{-1}$ refers to inverse or pseudoinverse. R is also known as the change of basis matrix or transition matrix in the literature. If R is a full rank matrix then $\hat{S}=\tilde{S}R$ with the goal to minimize $\|S-\hat{S}\|_2$. Two conditions need to be fulfilled: Firstly, that R is a full rank matrix i.e., the determinant of R is not zero, $\det(R)\neq 0$. This condition ensures that the new basis function $\tilde{S}$ consists of linear independent terms. Secondly, that $\|\tilde{S}R-S\|^2$ satisfies a threshold, or tolerance, limit. By selecting a correct tolerance limit it can be ensured that the new basis function $\tilde{S}$ does not create ill condition problems in the adaptation.

Figure 4:
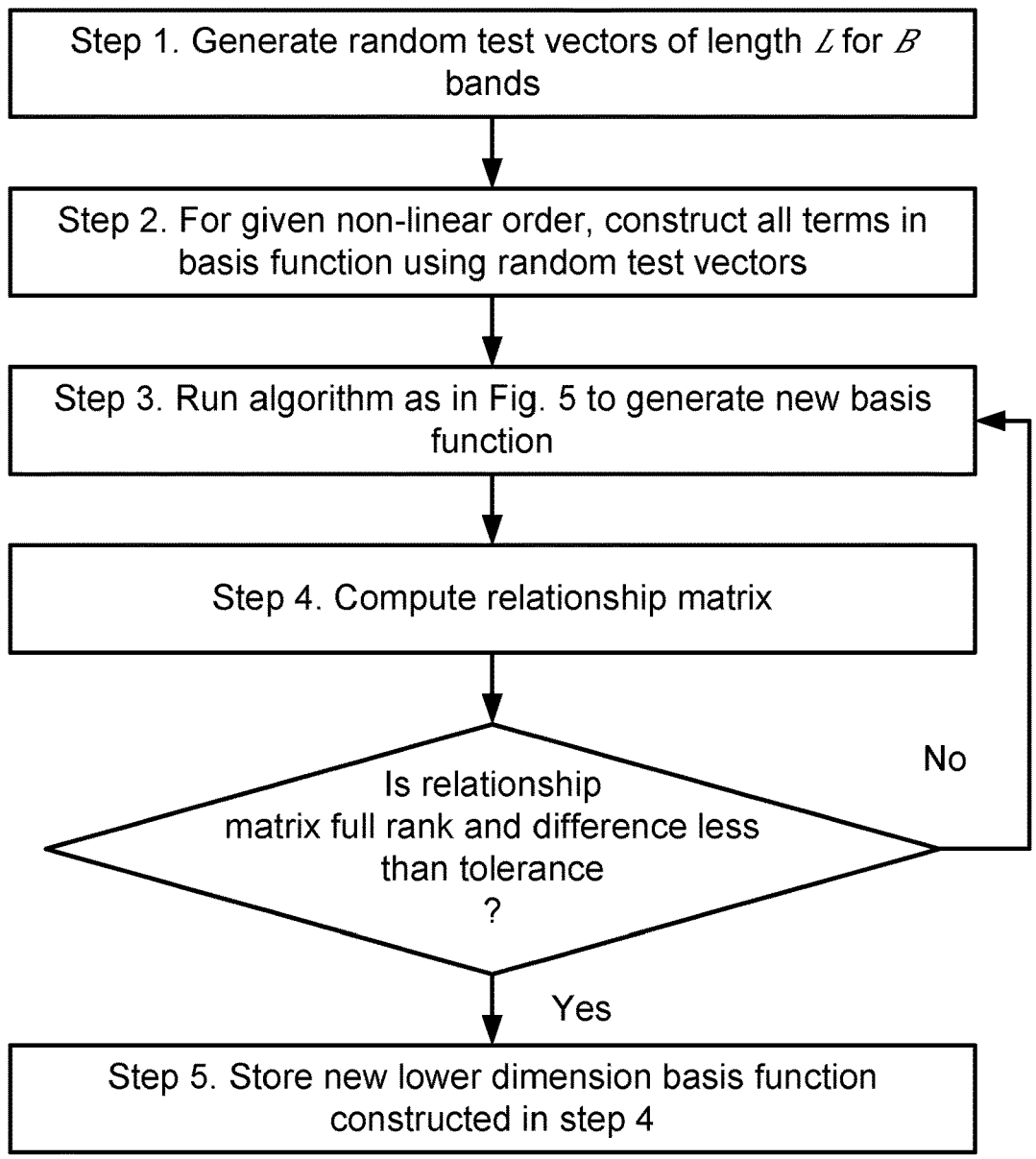
FIGS. 4 and 5 are flowcharts of methods for constructing a new basis function $\tilde{S}$ according to an embodiment.
Figure 5:
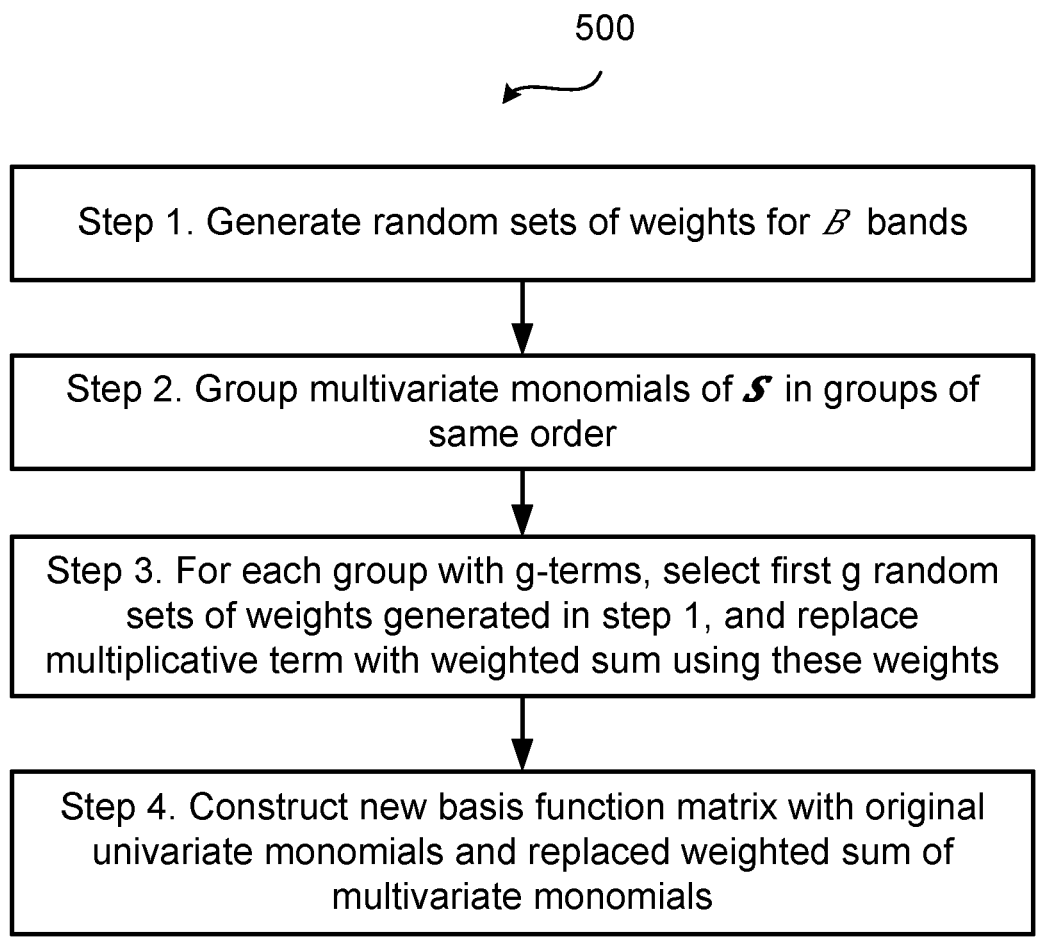

One example of how the new basis function $\tilde{S}$ can be constructed is illustrated in the flowcharts 400 and 500 of FIG. 4 and FIG. 5. The calculation of the weights starts with the generation of random test vectors of length L and for each of B frequency bands with $$L \geq \sum_{r=1}^{P} \binom{B+r-2}{r-1}.$$

This is referred to as Step 1 in FIG. 4. In Step 2 of FIG. 4 these test vectors are used to construct the original basis function matrix S. The number of terms used in the basis function S depends on the maximum non-linear order and memory taps of the DPD and those terms can be identified using Equation (1). Step 3 of FIG. 4 is elaborated in FIG. 5 which provides new basis function $\tilde{S}$. In Step 4 of FIG. 4 it is checked whether the new basis function $\tilde{S}$ satisfies the two conditions disclosed above. Finally, the new basis function $\tilde{S}$ is stored.

There are four steps in FIG. 5. In Step 1 random weight vectors for B frequency bands are generated. A maximum of U·B weights are needed, where it can be shown that $$U = \binom{B+P-2}{P-1}.$$

Here, U represents the number of terms with order P−1 in the S-DPD equation. Since the same weights are reused to replace terms from order 2 to P−2, the maximum number of weights to replace terms is needed only for order P−1. In Step 2 terms in S that are to be replaced are identified. The terms that were identified to be replaced are ordered according to the order of those terms. For example, for the triple-band case the order 4 group consists of the terms $|x_1\|x_2|^2|x_3|$, $|x_1|^2|x_2\|x_3|$, . . . , $|x_3|^2|x_2\|x_1|$ in S that are to be replaced. In Step 3 the same group multiplicative terms are converted with their weighted summation magnitude. Weights generated in Step 2 of FIG. 5 are used. For example, the terms $|x_1\|x_2|^2|x_3|$ is replaced by $(w_{1,1}|x_1|+w_{1,2}|x_2|+w_{1,3}|x_3|)^4$. Similarly, the term $|x_1|^2|x_2\|x_3|$ is replaced by $(w_{2,1}|x_1|+w_{2,2}|x_2|+w_{2,3} x_3|)^4$ and $|x_3|^2|x_2\|x_1|$ by $(w_{3,1}|x_1|+w_{3,2}|x_2|+w_{3,3}|x_3|)^4$. Different weights i.e., $w_{i,j}\neq w_{i+1,j}$ are used for $|x_j|$. Usage of different weights ensures that the new basis function $\tilde{S}$ satisfies the condition that R is a full rank matrix. Additionally or alternatively, the weights might be assigned different preconditions to avoid an ill-conditioned optimization problem.

Steps 2 and 3 of FIG. 5 are then repeated again but for order 5. Terms with order 5 e.g., $|x_1\|x_2|^3|x_3|$, $|x_1|^3|x_2\| x_3|$, . . . , $|x_3|^3|x_2\|x_1|$ are replaced for the triple-band example. According to one design goal, the same weighted summation of magnitude should be used as many times as possible. Therefore, weights $w_{1,1}$, $w_{1,2}$, $w_{1,3}$ are to be used again and the term $|x_1\|x_2|^3|x_3|$ is replaced by the term $(w_{1,1}|x_1|+w_{1,2}|x_2|+w_{1,3}|x_3|)^5$. Reusing the same weights enables the number of LUTs to be reduced.

Again, the term $|x_1|^3|x_2\|x_3|$ will be replaced by the term $(w_{2,1}|x_1|+w_{2,2}|x_2|+w_{2,3}|x_3|)^5$ and so on. The term $|x_1|^3|x_2\|x_3|$ requires three-dimension LUTs whereas the new generated term $(w_{2,1}|x_1|+w_{2,2}|x_2|+w_{2,3}|x_3|)$ needs one-dimension LUTs. Steps 2 and 3 of FIG. 5 are then repeated again until all the terms that are to be replaced by their weighted summation magnitude. All the new terms are stored in the new basis function $\tilde{S}$.

Proposed Architectures for DPDs Using H-LUTs

Once the new basis function is constructed according to the above, the new basis function can be used to set up the LUTs in the S-DPD architecture. As mentioned earlier, the terms in the new basis function determine address entries in the LUTs and hence one LUT is needed for all the terms with the same address entry. For example, one LUT can be used to represent both the term $(w_{1,1}|x_1|+w_{1,2}|x_2|+w_{1,3}|x_3|)^4$ and the term $(w_{1,1}|x_1|+w_{1,2}|x_2|+w_{1,3}|x_3|)^5$ since both terms have the same address entry, which is $(w_{1,1}|x_1|+w_{1,2}|x_2|+w_{1,3} |x_3|)$. Setting the LUTs is an offline mechanism and a design parameter. Therefore, the whole procedure presented above is outside the scope of the actual S-DPD architecture.

Figure 6:
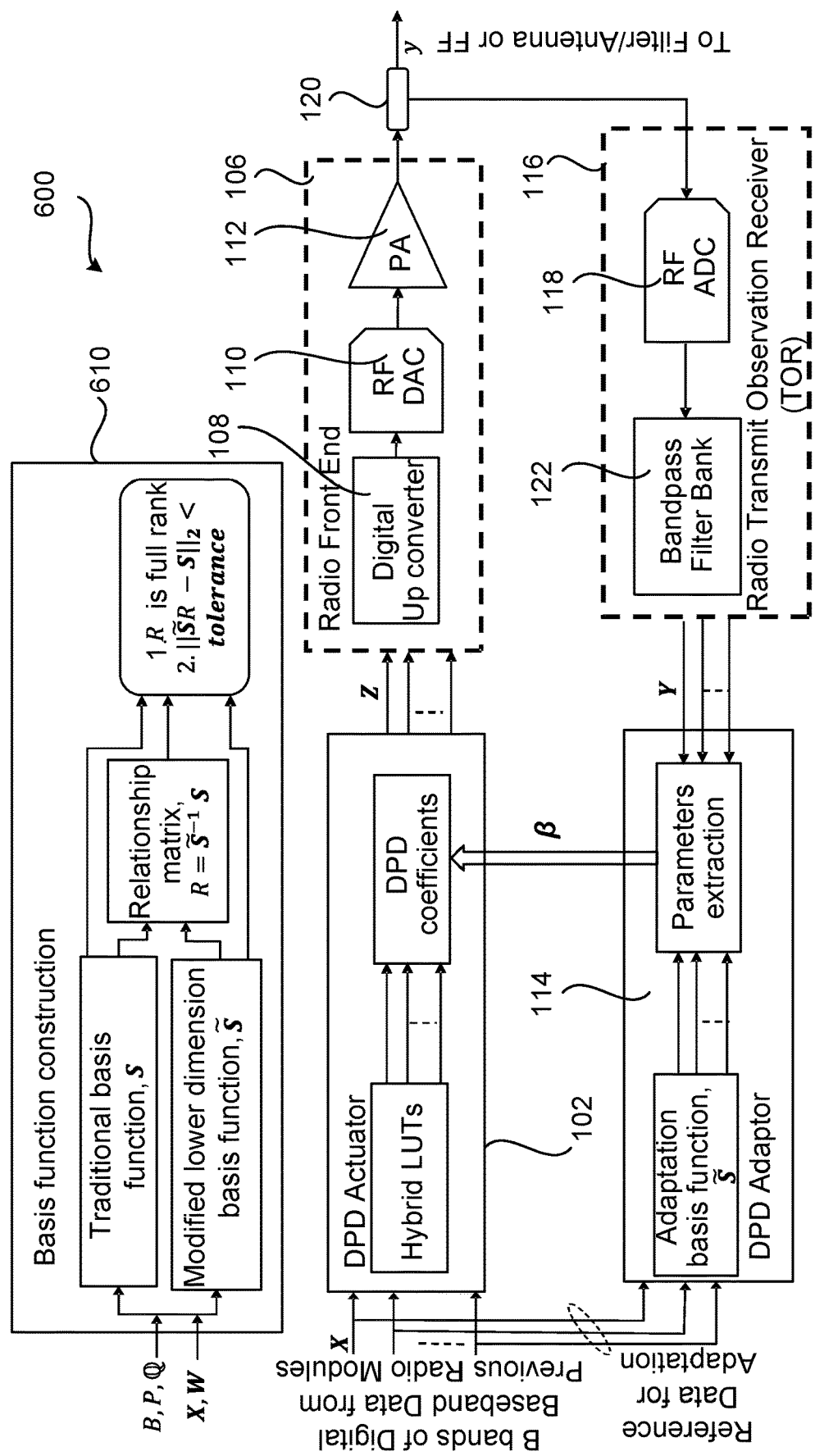
FIGS. 6, 7, 8, and 15 illustrate a radio node that includes DPDs in accordance with embodiments of the present disclosure.
Figure 7:
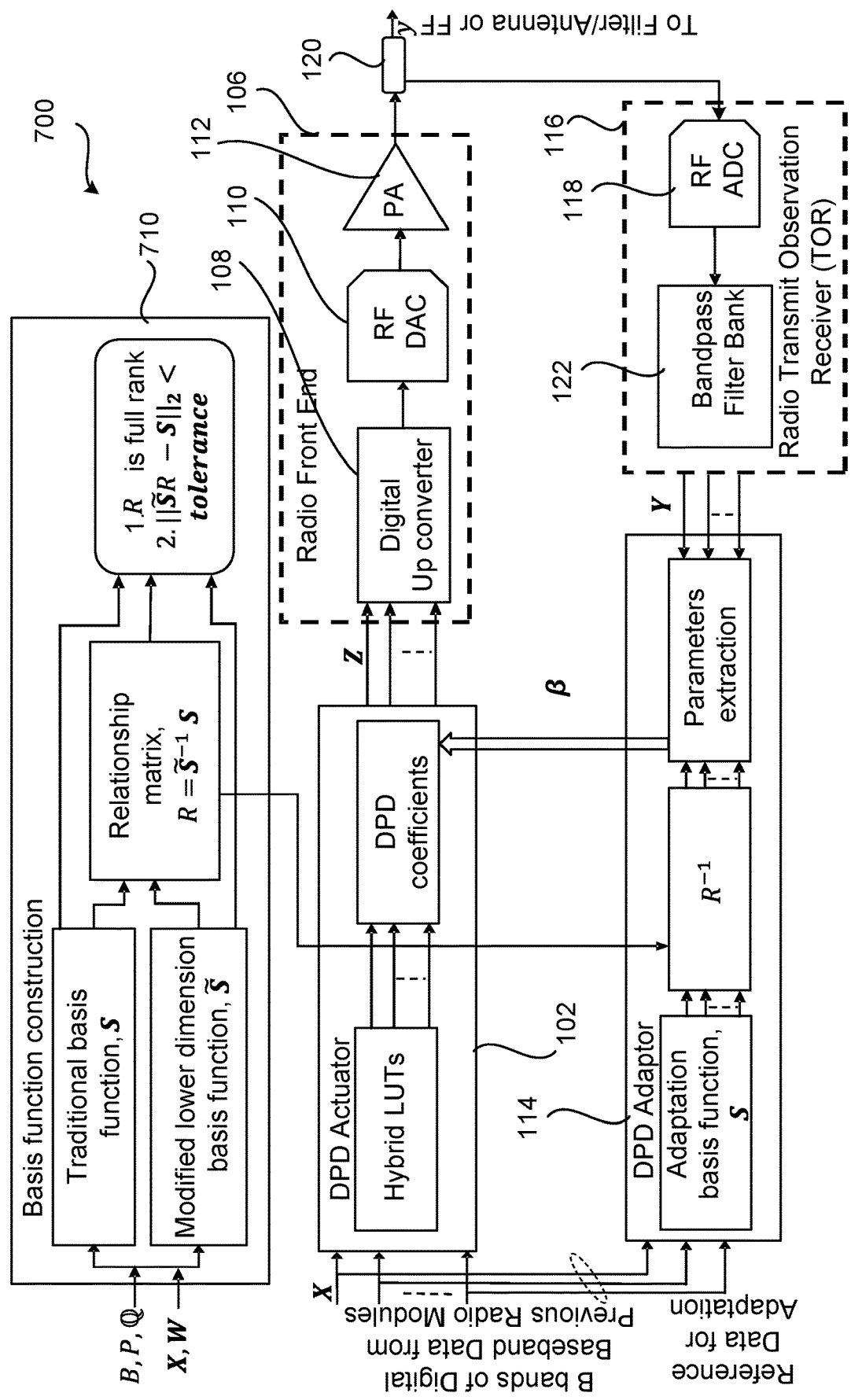
Figure 8:
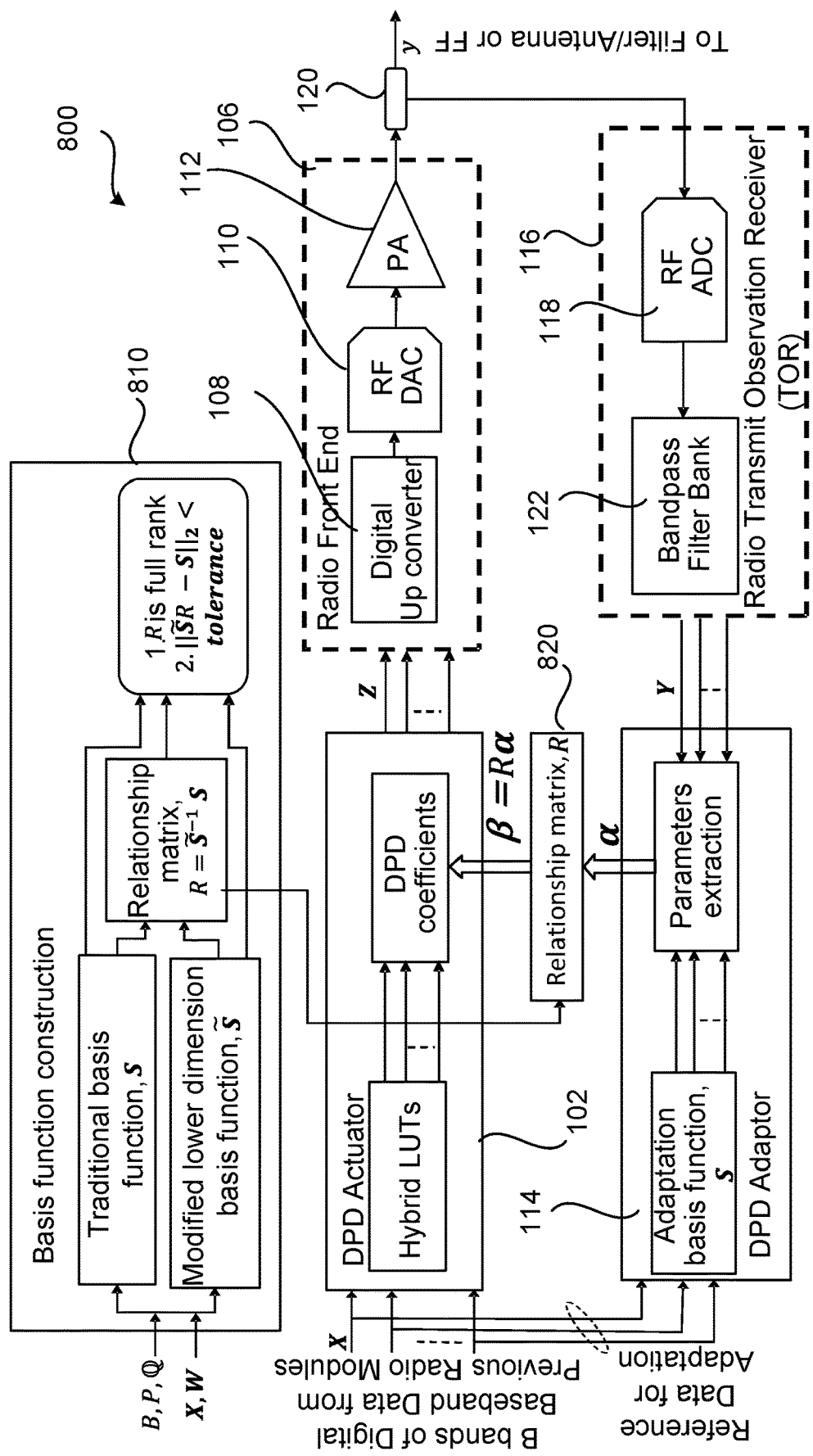

Three S-DPD architectures are proposed using H-LUTs. In all three architectures, the S-DPD actuator remains the same, whereas the S-DPD adaptor functionality is different in the three architectures. In the S-DPD architecture 600 of FIG. 6, the S-DPD adaptor uses new constructed basis function $\tilde{S}$, as determined as part of the basis function construction illustrated at reference numeral 610, and estimates the S-DPD coefficients $\beta$ which are used in the S-DPD actuator as disclosed below. This architecture uses lower dimension basis functions in the adaptation. The actuator uses H-LUTs derived from the lower dimension basis functions. The working mechanism of the H-LUTs will be disclosed below. In the S-DPD architecture 700 of FIG. 7, the S-DPD adaptor 114 uses the basis function S which is passed through the relationship matrix R as determined as part of the basis function construction illustrated at reference numeral 710. As a result, the S-DPD adaptor of the architecture in FIG. 7 still estimates the S-DPD coefficients $\beta$ and the rest remains the same as in FIG. 6. This architecture uses a H-LUT actuator derived from the lower dimension basis functions. The adaptor uses the original higher dimension basis functions. In the S-DPD architecture 800 of FIG. 8, the S-DPD adaptor uses the basis function S and the S-DPD adaptor estimates the DPD coefficients $\alpha$. These coefficients are passed through the relationship matrix R and $\beta$ are used in the S-DPD actuator where $\beta=R\alpha$, as illustrated at reference numeral 820. In FIG. 8 the S-DPD actuator and the S-DPD adaptor are the same as in FIG. 7, and the basis function construction is illustrated at reference numeral 810. Nevertheless, in FIG. 8 the S-DPD coefficients are estimated first using the original higher dimension basis functions. Later they are modified using the relationship matrix.

Proposed Modifications to Actuator

One purpose of the proposed S-DPD architectures is to use lower dimension H-LUTs in the actuator. Next will be disclosed two H-LUT architectures considering the new basis functions. First is disclosed how (B−q)-dimension H-LUTs can be constructed and used. Then it is disclosed how one-dimension H-LUT can be constructed and used.

(B–q)-Dimension H-LUTs and S-DPD Architectures

One goal of the proposed S-DPD architectures is to reduce the size, or number of address entries, of the H-LUT. For B frequency bands the proposed actuator comprises LUTs which require maximum B–q address entries, where q≥1. In general terms, there are three main components in the H-LUT architecture. Below these components are also called a first set of LUTs, a second set of LUTs, and a third set of LUTs.

As shown above, it is possible to express S-DPD output as: $z_1 = x_1 + x_1 \{H_1(|x_1|,\beta) + H_2(|x_2|,\beta) + H_3(|x_1|+|x_2|,\beta) + H_4(|x_1|-|x_2|,\beta)\}$, which comprises several lower dimension H-LUTs. Here H-LUT address entry determines the dimension of the H-LUT. For instance, $H_i(|x_1|+|x_2|,\beta)$ needs one-dimension H-LUTs whilst $H_i(|x_1\|x_2|,\beta)$ needs two-dimension H-LUTs.

Figure 9:
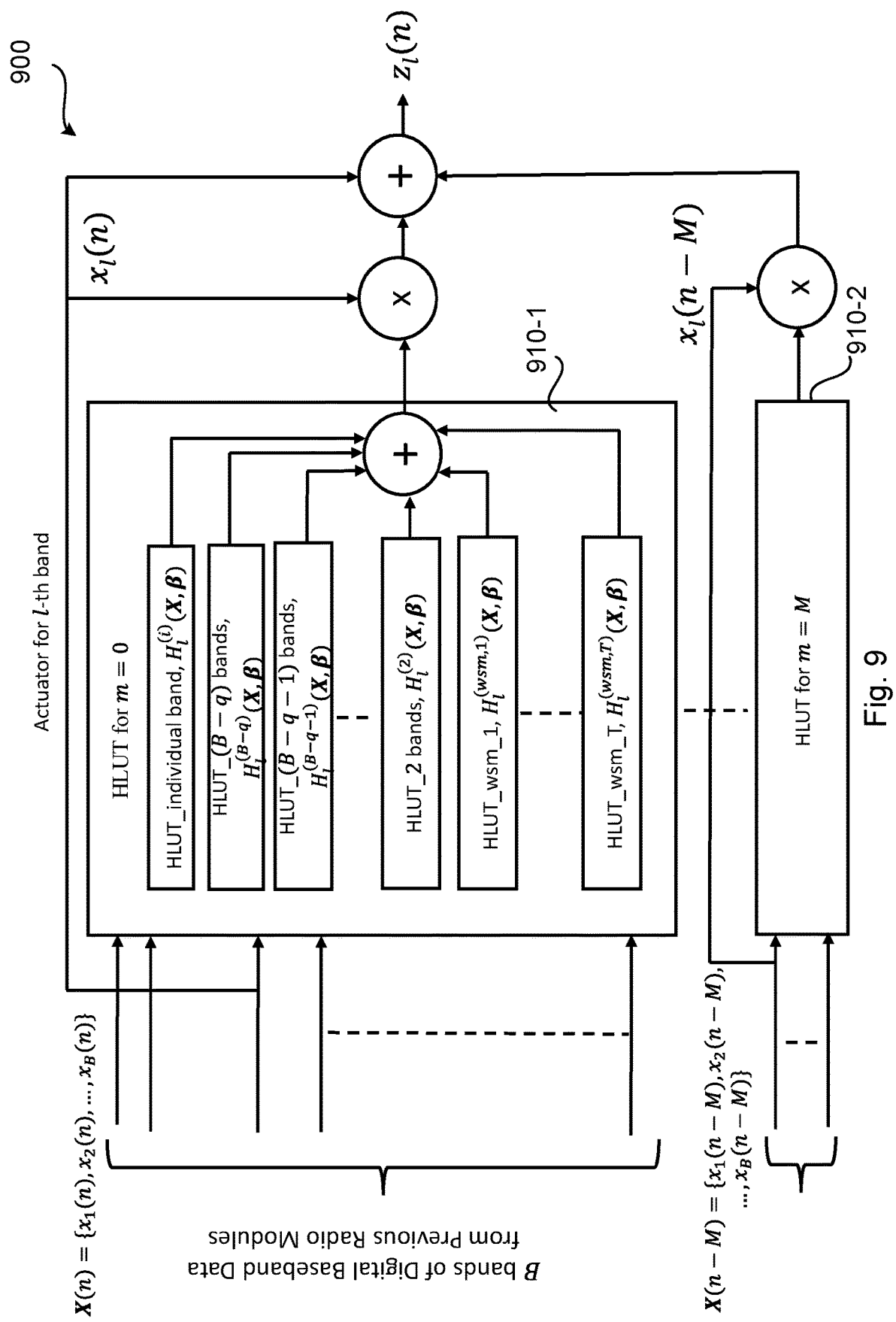
FIGS. 9 and 13 illustrate H-LUT structures and corresponding S-DPD actuator architectures in accordance with embodiments of the present disclosure.

Several H-LUTs with maximum B–q dimensional input address entry, q={1, 2, . . . , B–2} are to be used. When q=B–1 there will only be one-dimension H-LUTs which is disclosed separately. The proposed B–q dimension H-LUTs and corresponding S-DPD actuator is shown in FIG. 9. In FIG. 9 is illustrated at 900 a proposed B–q dimension H-LUT structure and corresponding S-DPD actuator architecture, and where the first and the last H-LUTs are illustrated at reference numerals 910-1 and 910-2, respectively. Circles with "+" denote addition and circles with "x" denote multiplication. Here H-LUT for m=0 only considers current input signals coming from B frequency bands. Similarly, H-LUT for m=M considers the M:th previous input signals coming from B frequency bands. The skilled person understands how FIG. 9 can be extended with several cross-memory taps for generalized memory polynomial as mentioned earlier. One advantage of this approach compared is that the output from the H-LUTs are added instead of being multiplied. As such, the proposed H-LUTs and corresponding S-DPD architectures significantly reduce the computational cost in the actuator.

H-LUTs for Individual Frequency Bands

The first components (i.e., the first set of LUTs) are hereinafter denoted H-LUT individual frequency bands. These H-LUTs only consider one frequency band input at a time. The superscript (i) is used to denote "individual" frequency band. There are B numbers of LUTs for each memory tap in this case. The output from the HLUT_individual frequency band for the l:th frequency band can be expressed as:

$$H_l^{(i)}(x, n) = \left( \beta_{l,m}^{(i)} + \sum_{b=1}^{B} \sum_{p=1}^{P-1} \beta_{l,m,p,b}^{(i)} |x_b(n - Q_m)|^p \right) \quad (2)$$

Figure 10:
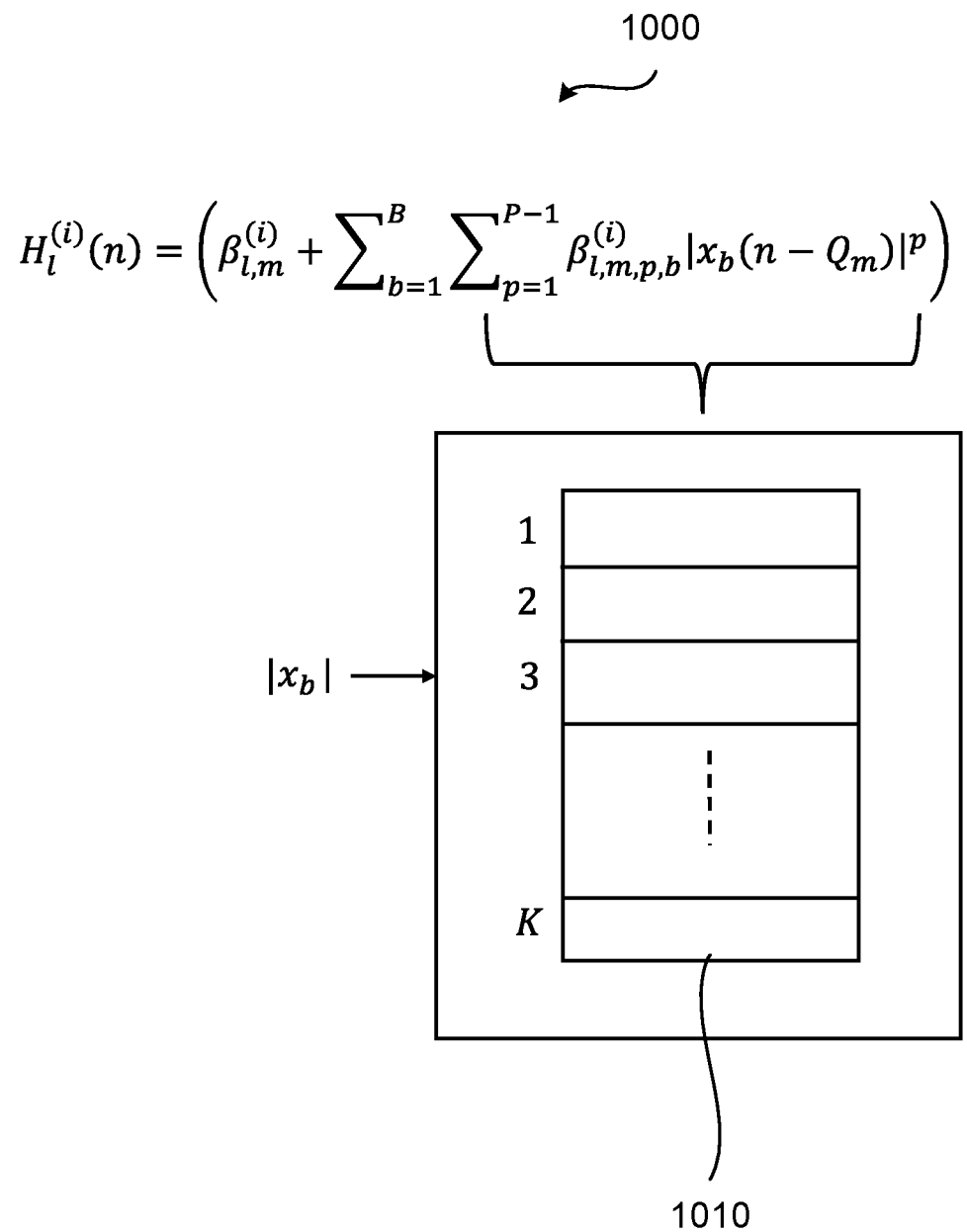
FIGS. 10, 11, 12, and 14 illustrate the structure of H-LUTs in accordance with embodiments of the present disclosure.

Equation (2) only considers one frequency band input when constructing the H-LUT which is further illustrated in FIG. 10. It is noted that $\beta_{l,m}^{(i)}$ is included in the l:th LUT. FIG. 10 illustrates at 1000 the structure of the HLUT_individual frequency band where B numbers of LUTs, one of which is illustrated at reference numeral 1010, are needed for each memory taps. For example, for 3 frequency bands, there are three individual band H-LUTs, i.e., $H_1^{(i)}(|x_1|,\beta)$, $H_2^{(i)}(|x_2|,\beta)$, $H_3^{(i)}(|x_3|,\beta)$ when the DPD does not have any memory taps.

H-LUTs for (B–r) Frequency Bands

The second components (i.e., the second set of LUTs) are hereinafter denoted HLUT_(B–q) frequency bands to HLUT_2 frequency bands. In HLUT_(B–q) frequency bands the LUTs consider input coming from (B–q) frequency bands out of the B frequency bands. Similarly, in HLUT_(B–q–1) frequency bands the LUTs consider input coming from (B–q–1) frequency bands out of the B frequency bands, and so on. In this case, there are several H-LUTs from all the possible combinations of (B–q) frequency bands out of the B frequency bands. Some of the combinations can be removed from the H-LUTs through empirical analysis.

There are r={q, q+1, . . . , B–2} H-LUTs in this case. One goal of the H-LUTs is to pick a subset of frequency bands to construct the basis functions. Let $\mathcal{B} = \{1, 2, \ldots, B\}$ refer to the set of all frequency band indices. Let $$\mathcal{A}_r = \left\{ i_1, i_2, \ldots i_k, \ldots, i_{\binom{B}{B-r}} \right\}$$

denote the superset containing sets $i_k$ of all the combinations of B–r frequency bands, or in other words a set $i_k$ is drawn from $\mathcal{B}$ choosing B–r elements or $i_k \subset \mathcal{B}$. For instance, when there are three bands, B=3, q=1,r=1 and B–r=2 then $\mathcal{A}_1 = \{\{1, 2\}, \{1, 3\}, \{2, 3\}\}$. When B=4, q=1, r=1, then $\mathcal{A}_1 = \{\{1, 2, 3\}, \{1, 2, 4\}, \{1, 3, 4\}, \{2, 3, 4\}\}$. When B=4, q=1,r=2, then $\mathcal{A}_2 = \{\{1,2\} \{1, 3\}, \{1, 4\}, \{2, 3\}, \{2, 4\}, \{3, 4\}\}$. Using the defined set notation, the output from the B–r H-LUTs can be expressed as:

$$H_l^{(B-r)}(x, n) = \quad (3)$$

$$\sum_{k=1}^{\binom{B}{B-r}} \sum_{p_1=1}^{P-1} \sum_{p_2=1}^{p_1} \cdots \sum_{p_{B-r}=1}^{p_{B-r-1}} \beta_{l,m,k,p_1,p_2,\ldots,p_{B-r}}^{(B-r)} \prod_{b \in i_k} |x_b(n - Q_m)|^{(p_b - p_{b+1})}$$

Figure 11:
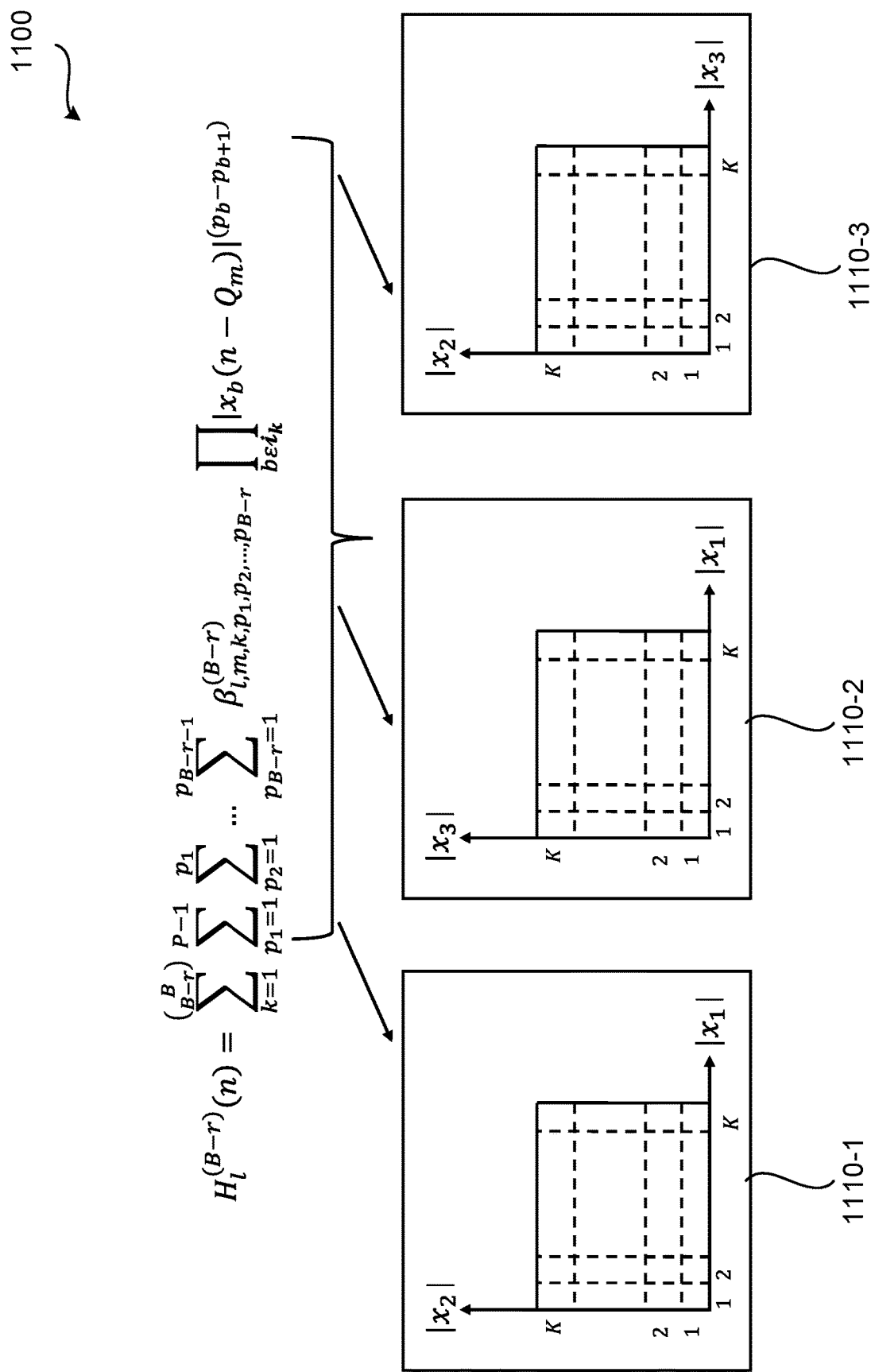

FIG. 11 illustrates at 1100 the structure of the H-LUTs for an example of triple bands, i.e., when B=3, q=1 and r=1, schematically illustrating H-LUTs at reference numerals 1110-1, 1110-2, 1110-3. In this case, $$\binom{B}{B-r}$$

numbers of LUIS 101 each memory tap are needed. There are thus $$\binom{B}{B-r}$$

numbers of n-LUIS 101 each of B–r frequency bands H-LUTs. Each of the H-LUTs can take maximum B–q dimension input signals, hence referred to as (B–q)-dimension H-LUTs. Some of the H-LUTs can be removed through empirical analysis.

H-LUTs for Weighted Summation of Magnitude Frequency Bands

The third components (i.e., the third set of LUTs) are hereinafter denoted HLUT_wsm_1 to HLUT_wsm_T. Here "wsm" is short for weighted summation of magnitude. This is where dimension has been reduced. In other words, the state-of-the-art architecture uses B-dimension H-LUTs to represent these components whereas here, one-dimension H-LUT address entries using weighted summation of magnitude of the input signals are used. The number of H-LUTs and address entries depends on the DPD. These H-LUTs operate on one-dimension input signals by linearly combining all the input signals from the B frequency bands. Several HLUT_wsm blocks are used. Each of these HLUT_wsm is constructed from the weighted summation of the magnitude from all the frequency bands. The number of H-LUTs depends on the maximum non-linear order and the number of frequency bands. Assume there is T number of H-LUTs that use weighted summation of the magnitude. As disclosed above, different sets of weights are needed to adapt all the terms correctly, which leads to different types of HLUT. Let $w_l^{(t)}$ refer to the weight that is to be used for the l:th frequency band signal for the t:th H-LUT, where the weights can take any real number value. The construction of $w_l^{(t)}$ is described in FIG. 12. The output from the t:th H-LUT that uses weighted summation of magnitude can be expressed as:

$$H_l^{(wsm,t)}(x,n) = \sum_{p=B}^{P-1} \beta_{l,m,p}^{(wsm,t)} \left( \sum_{b=1}^{B} w_b^{(t)} |x_b(n - Q_m)| \right)^p \quad (4)$$

Figure 12:
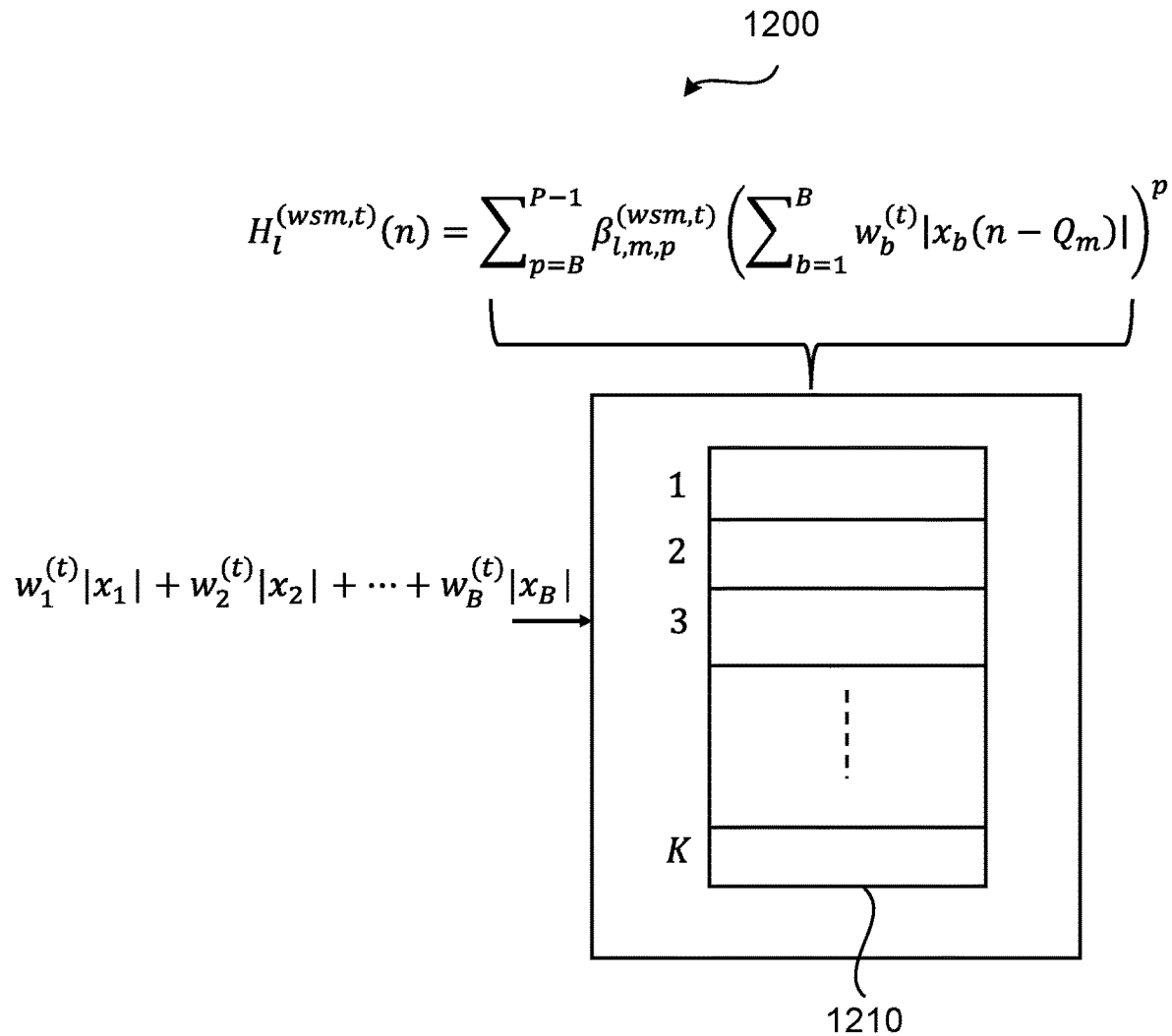

The structure of the wsm H-LUT is illustrated at 1200 in FIG. 12 which shows that the wsm H-LUTs, one of which is illustrated at reference numeral 1210, operate on one-dimension input signals. The resolution of the H-LUT is shown to be the same as before i.e. K, however, this can be different for different H-LUTs. Some of the H-LUTs can be removed through empirical analysis.

One-Dimension H-LUTs and Corresponding S-DPD Architectures

Figure 13:
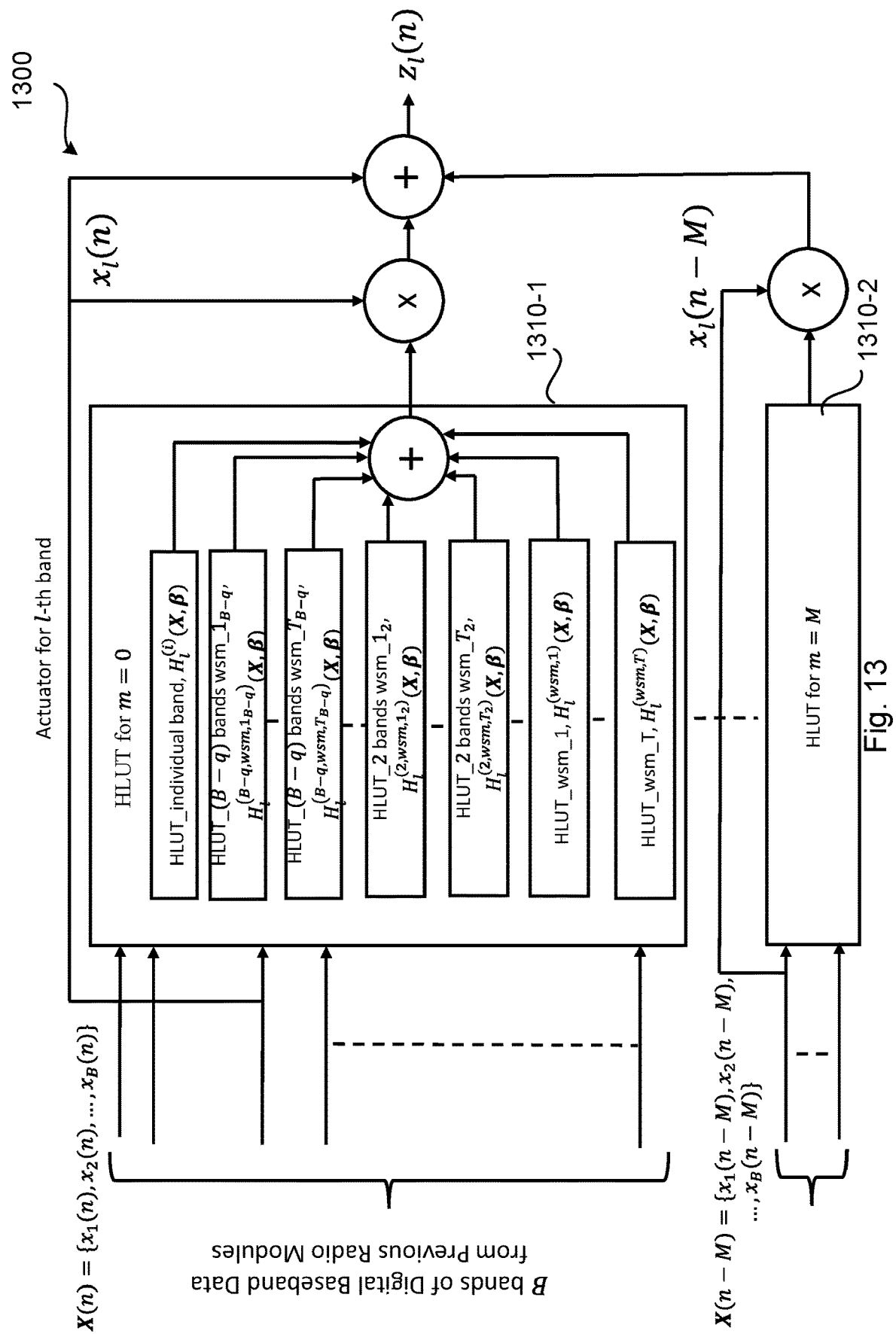

Next will be disclosed details of one-dimensional H-LUTs and a corresponding S-DPD actuator. The details are similar to the above disclosed (B−q)-dimension LUTs, but with changes made to the second component, i.e., the H-LUT_(B−q) frequency bands to H-LUT_2 frequency bands. Since both the H-LUTs for individual frequency bands and the H-LUTs for weighted summation of the magnitude of all frequency bands as disclosed above operate on one-dimension input signals, these will remain unchanged in this proposed one-dimension H-LUTs. As above, these second components require (B−q)-dimension H-LUTs and in this case the actuator contains only one-dimension H-LUTs. The details of the one-dimension LUTs are disclosed below. To capture the dependency of different frequency bands the weighted summation of the magnitude of B−r frequency bands is used. As such, each H-LUT operates on one-dimension input signals. FIG. 13 at 1300 illustrates the one-dimension H-LUTs and corresponding S-DPD actuator architecture, and where the first and the last H-LUTs are illustrated at reference numerals 1310-1 and 1310-2, respectively. Circles with "+" denote addition and circles with "x" denote multiplication. The expression for $H_l^{(t)}((x,n)$ and $H_l^{(wsm,t)}(x,n)$ follow Equation (2) and Equation (4), respectively. In FIG. 13 the H-LUTs for m=0 only consider the current input signals coming from B frequency bands. Similarly, the H-LUTs for m=M consider the M:th previous input signals coming from B frequency bands. The skilled person understands how FIG. 13 can be extended with several cross-memory taps for generalized memory polynomial as mentioned earlier. The expression for B−r frequency bands weighted summation of magnitude can be formulated as:

$$H_l^{(B-r,wsm,tB-r)}(x,n) = \sum_{k=1}^{\binom{B}{B-r}} \sum_{p=1}^{P-1} \beta_{l,m,k,p}^{(B-r,wsm,tB-r)} \left( \sum_{b \in i_k} w_b^{(tB-r)} |x_b(n - Q_m)| \right)^p \quad (5)$$

Figure 14:
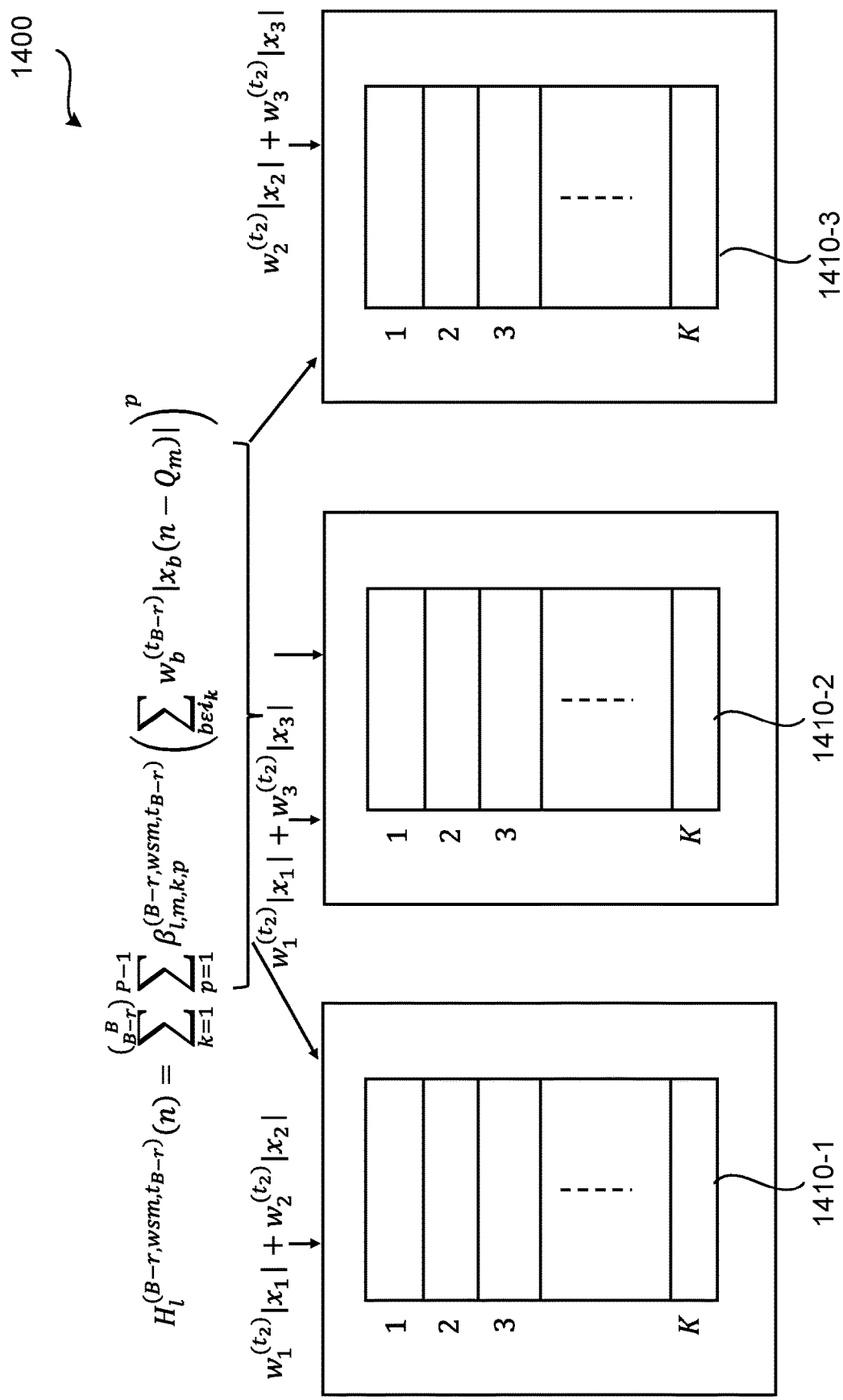

Here, the definitions of $\mathcal{A}_r$ and $i_k$ are the same as described above. The H-LUT structure for an example case of triple-band is illustrated at 1400 in FIG. 14. In this example, $$\binom{B}{B-r}$$

numbers of H-LUTs are needed for each of B−r frequency bands H-LUTs. FIG. 14 illustrates an example where B=3, q=1 and r=1, where the H-LUTs are schematically illustrated at reference numerals 1410-1, 1410-2, 1410-3. As shown in FIG. 14, each of the H-LUTs takes a maximum of one-dimension input signals. Some of the H-LUTs can be removed through empirical analysis.

Experimental Results Using Wideband Power Amplifier

To validate our proposed S-DPD architectures and modified basis functions, experiments were conducted using a wideband power amplifier. Three non-contiguous frequency bands were used: LTE band 3 (B3), LTE band 1 (B1), and LTE band 7 (B7), where each frequency band has one 20 MHz carrier. It is here noted that the proposed DPD architectures can support any number of frequency bands and any combination of carriers. The proposed DPD architectures were tested with 2 and 1 dimension basis functions, where 2 dimensions correspond to (B−q)-dimension S-DPD architecture with (B=3, q=1; B−q=2). For benchmark comparison, a 3-dimension S-DPD architecture which corresponds to a B-dimension problem was used. One goal of the experiments is to validate the generation of the lower dimension basis functions as mentioned above and Equations (1)-(5) were used. For all experiments, P=6 and 5 memory taps were used. The experimental results are summarized in Table I. It can be seen that the proposed DPD architectures provide the same performance compared to the B-dimension S-DPD architecture.

TABLE I

Experimental results using wideband PA

| | B dimension S-DPD (B = 3) | (B − q) dimension S-DPD (B = 3, q = 1) | One-dimension S-DPD |
|---|---|---|---|
| ACLR (dBc) B3 | −52.4, −51.7 | −52.3, −51.9 | −52.2, −51.6 |
| ACLR (dBc) B1 | −52.6, −52.8 | −52.8, −53.0 | −52.5, −53.0 |
| ACLR (dBc) B7 | −52.4, −52.9 | −52.6, −53.0 | −52.7, −52.8 |

Advantages and Extensions

From the above follows that the number of H-LUTs depends on the number of frequency bands B and the non-linear order P, and it can be shown that the that the required number of H-LUTs is $$\binom{B+P-2}{P-1}$$

for the same dimension reduction result as with a traditional S-DPD. For triple frequency bands when P=6, 21 one-dimension H-LUTs are needed using the above proposed DPD architectures. However, the number of H-LUTs can be reduced by supporting higher dimension H-LUTs. For instance, for the same use case, it is possible to use 9 one-dimension H-LUTs or 3 two-dimension H-LUTs. Therefore, the proposed (B−q)-dimension H-LUTs and one-dimension H-LUTs provide flexibility in the actuator design.

The operations performed by one H-LUT does not depend on operations performed by another H-LUT. Hence, the H-LUTs can be implemented in parallel. As a result, parallel computing can be taken advantage of in the actuator implementation. Due to the parallel implementation in the H-LUTs, it is also possible to make a tradeoff between the number of H-LUTs and performance. For instance, for the use case where 21 one-dimension H-LUTs are required it is possible to remove some of the H-LUTs corresponding to the higher-order terms and test the overall performance. Using empirical analysis it is possible to identify the optimal number of LUTs for the DPD which provides satisfactory performance with lower implementation cost. In this way, the number of H-LUTs can be considered as a design parameter.

The herein disclosed DPD architectures can be extended to direct adaptation. For example, for a dual-band system P=3, with M memory taps, and resolution K, direct adaptation can be realized using the following expression:

$$z_1(n) = \sum_{m=0}^{M} x_1(n-m)\{T_{m,0}(|x_1(n-m)|) + T_{m,1}(|x_2(n-m)|) + T_{m,2}(|x_1(n-m)| + |x_2(n-m)|)\}$$

where each of the tables is defined as:

$$T_{m,0}(\cdot) = \begin{bmatrix} g_{m,0,0} \\ g_{m,0,1} \\ \vdots \\ g_{m,0,K} \end{bmatrix}, T_{m,1}(\cdot) = \begin{bmatrix} g_{m,1,0} \\ g_{m,1,1} \\ \vdots \\ g_{m,1,K} \end{bmatrix}, T_{m,2}(\cdot) = \begin{bmatrix} g_{m,2,0} \\ g_{m,2,1} \\ \vdots \\ g_{m,2,K} \end{bmatrix}.$$

Generally, $$z_l(n) = \sum_{m=0}^{M} x_l(n-m) \sum_{u=1}^{U \leq \binom{B+P-2}{P-1}} T_{m,u}\left(\sum_{b=1}^{B} w_{u,b}|x_b(n-m)|\right)$$

where, for a LUT with K bins the tables are defined as:

$$T_{m,u}(\cdot) = \begin{bmatrix} g_{m,u,0} \\ g_{m,u,1} \\ \vdots \\ g_{m,u,K} \end{bmatrix}.$$

The LUTs denoted by $T_{m,u}(\cdot)$ are vectors of gridpoint weights $g_{m,u,k}$. The argument of $T_{m,u}(\cdot)$ can also be considered as an index to the LUT and is a weighted summation of magnitudes of input signals.

Figure 15:
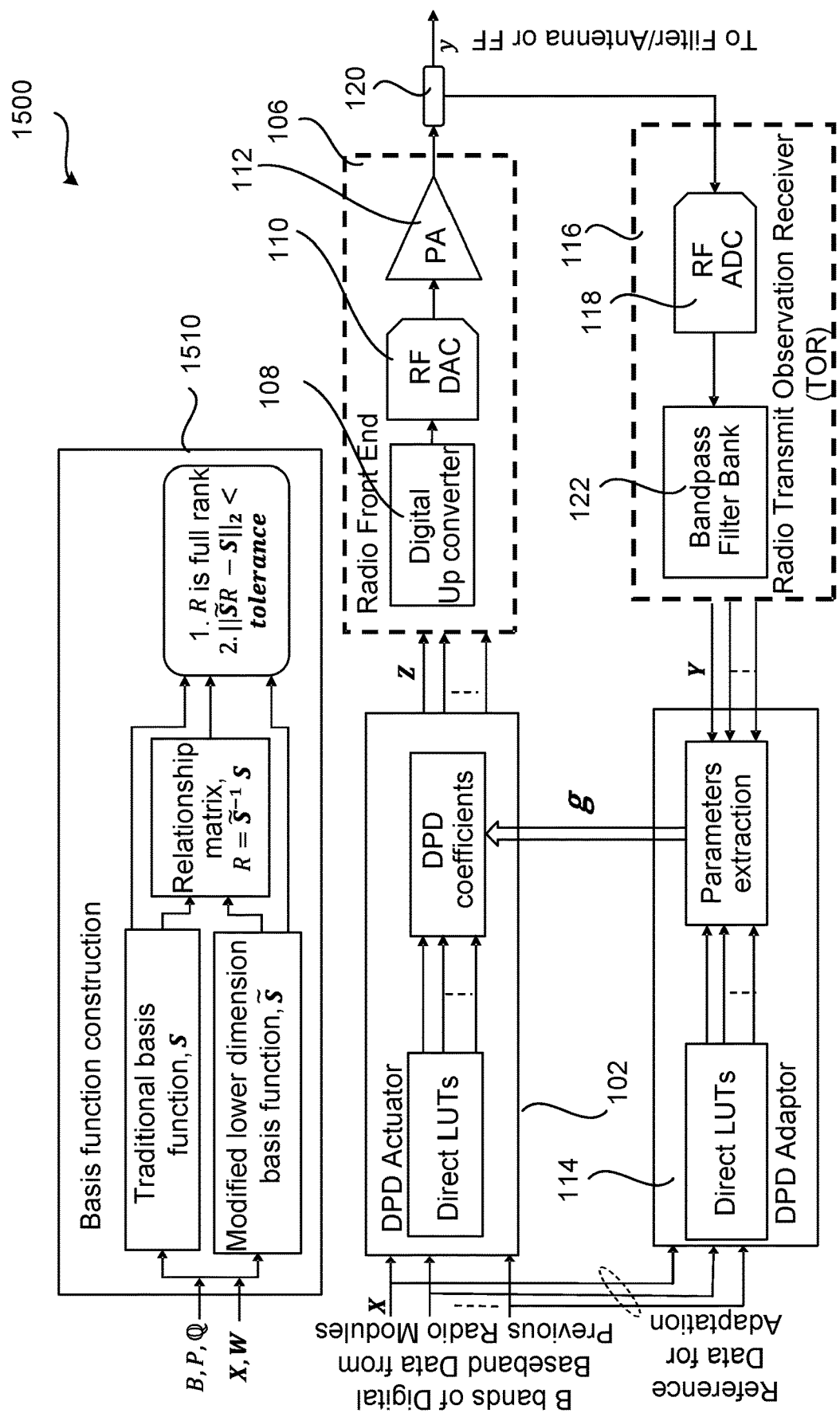

Using the proposed generation of basis functions it is possible to set up all the required LUTs for a given number of frequency bands and given non-linear order and number of memory taps. In this case the adaptor also uses LUTs and the proposed DPD architecture is illustrated in FIG. 15. In the DPD architecture 1500 of FIG. 15 both the actuator and the adaptor use lower dimension LUTs. In FIG. 15 g refers to the grid point weights and the adaptor directly identifies those weights. and the basis function construction is illustrated at reference numeral 1510.

Embodiments of Methods for Operating DPDs as Disclosed Above

Figure 16:
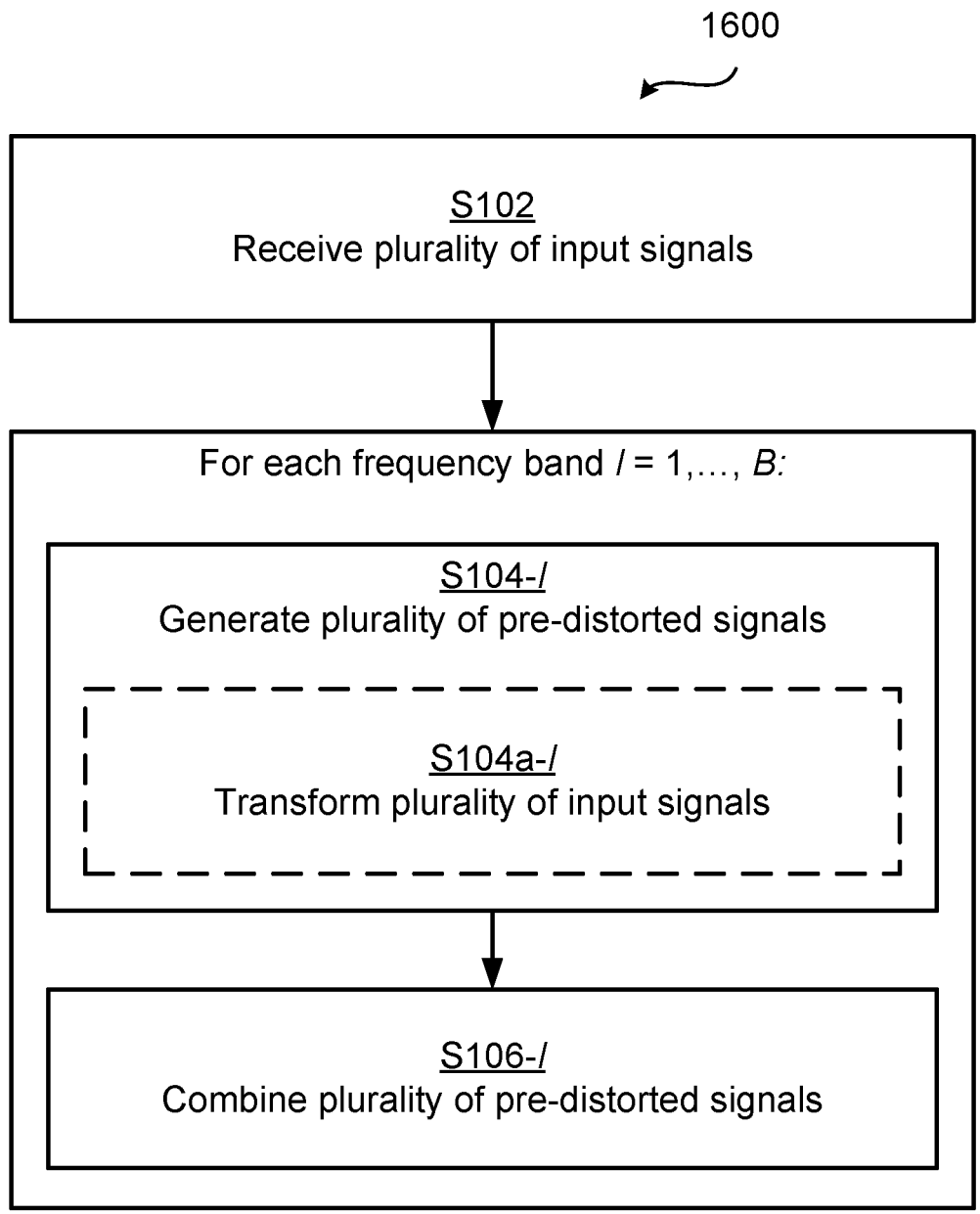
FIG. 16 is a flowchart of methods according to embodiments.

FIG. 16 is a flowchart 1600 illustrating embodiments of methods for operating a DPD for an access node. The methods are performed by the DPDs as disclosed above. The methods are advantageously provided as computer programs 1920.

S102: The DPD receives a plurality of input signals. Each input signal is received from a respective frequency band. Each signal is of memory order M.

The DPD for each frequency band l=1, . . . , B of the frequency bands performs actions S104-l and S106-l:

S104-l: The DPD generates a plurality of pre-distorted signals for the frequency band l based on the plurality of input signals coming from all the B frequency bands and using LUTs. According to the LUTs there is one LUT structure with LUT-based transforms per each combination of frequency band l=1, . . . , B and memory order m=0, . . . , M. Each of the LUT structures comprises combinations of LUTs of at most dimension B−q, where 1≤q<B.

S106-l: The DPD combines the plurality of pre-distorted signals for the frequency band to provide a combined pre-distorted signal for the frequency band.

Embodiments relating to further details of operating a DPD 1700 for an access node as performed by the DPD 1700 will now be disclosed.

In some embodiments, q=B−1.

As above, in some embodiments, the LUT-based transforms have adapted DPD coefficients β. As above, in some embodiments, the adapted DPD coefficients β are determined through training of the DPD with reference signals. In some embodiments, the grid points of the LUTs are, through training of the reference signals, adapted instead of the DPD coefficients β. In the later case the LUT structures for the DPD actuator and the adaptor are the same.

Each dimension represents a respective address entry to the LUTs. Each dimension has at least one LUT and possibly several LUTs. In particular, in some embodiments, each dimension represents a respective address entry to the LUTs.

As above, in some aspects, the transforms acts as filters that are used to filter the input signal. In particular, in some embodiments, the DPD is configured to perform action S104a-l as part of generating the plurality of pre-distorted signals:

S104a-l: The DPD transforms the plurality of input signals coming from all the B frequency bands using the LUT-based transforms. Which of the LUT-based transforms to use for transforming the plurality of input signals are determined by using the plurality of input signals as input to the LUTs.

As above, in some aspects, the LUT structures comprises a first set of LUTs, a second set of LUTs, and a third set of LUTs.

Details of the first set of LUTs will now be disclosed.

In some embodiments, the LUT structures for frequency band l and memory order m comprises a first set of LUTs adapted to use as input a one-dimensional input formed by the plurality of input signals from a respective individual frequency band of the B frequency bands. As above, the LUT-based transforms of the LUTs in the first set of LUTs for frequency band l at time index n for transforming input signal x are denoted $H_l^{(i)}(x,n)$ and might thus be defined as:

$$H_l^{(i)}(x,n) = \left(\beta_{l,m}^{(i)} + \sum_{b=1}^{B}\sum_{p=1}^{P-1}\beta_{l,m,p,b}^{(i)}|x_b(n-Q_m)|^p\right)$$

Details of the second set of LUTs will now be disclosed.

In some embodiments, the LUT structures for frequency band l and memory order m comprises a second set of LUTs adapted to use as input B−q down to 2-dimensional input formed by combinations of B−q of the frequency bands down to 2 of the frequency bands, where q>B−1. As above, the LUT-based transforms of the LUTs in the second set of LUTs for frequency band B−r, where r={q, q+1, ..., B−2}, at time index n for transforming input signal x are denoted $H_l^{(B-r)}(x,n)$ and might thus be defined as:

$$H_l^{(B-r)}(x,n) = \sum_{k=1}^{\binom{B}{B-r}}\sum_{p_1=1}^{P-1}\sum_{p_2=1}^{p_1}\cdots\sum_{p_{B-r}=1}^{p_{B-r}-1}\beta_{l,m,k,p_1,p_2,\ldots,p_{B-r}}^{(B-r)}$$

$$\prod_{b\in i_k}|x_b(n-Q_m)|^{(p_b-p_{b+1})}$$

Details of the third set of LUTs will now be disclosed.

In some embodiments, the LUT structures for frequency band l and memory order m comprises a third set of LUTs adapted to use as input a one-dimensional input formed by weighted linear combinations of the plurality of input signals from all B frequency bands. As above, the LUT-based transforms of the t:th LUT in the third set of LUTs when q>B−1 at time index n for transforming input signal x are denoted $H_l^{(wsm,t)}(x,n)$ and might thus be defined as:

$$H_l^{(wsm,t)}(x,n) = \sum_{p=B}^{P-1}\beta_{l,m,p}^{(wsm,t)}\left(\sum_{b=1}^{B}w_b^{(t)}|x_b(n-Q_m)|\right)^p$$

As above, alternatively, the LUT-based transforms of the LUTs in the third set of LUTs for frequency band B−r at time index n for transforming input signal x when q=B−1 are denoted $H_l^{(B-r,wsm,t_{B-r})}(x,n)$ and might thus be defined as:

$$H_l^{(B-r,wsm,t_{B-r})}(x,n) = \sum_{k=1}^{\binom{B}{B-r}}\sum_{p=1}^{P-1}\beta_{l,m,k,p}^{(B-r,wsm,t_{B-r})}\left(\sum_{b\in i_k}w_b^{(t_{B-r})}|x_b(n-Q_m)|\right)^p$$

The weighted linear combinations of the plurality of input signals might be weighted using weights $w_b^{(t)}$, $w_b^{(t_{B-r})}$. As disclosed above, each set of weights might be iteratively determined. When the weights are iteratively determined, each set of weights initially comprises randomly selected real number values.

As disclosed above, it is possible to identify the optimal number of LUTs for the DPD which provides satisfactory performance with lower implementation cost using empirical analysis. Hence, in some embodiments, only a subset of all available LUTs are used when generating the plurality of pre-distorted signals, and which LUTs to be included in the subset of LUTs is determined by empirical analysis.

As disclosed above, the herein disclosed DPD architectures can be extended to direct adaptation. Hence, in some embodiments, the LUTs have adapted grid points, where the grid points are identified using parameter estimation. Here both the DPD actuator and the adaptor use the same LUT structures.

Figure 17:
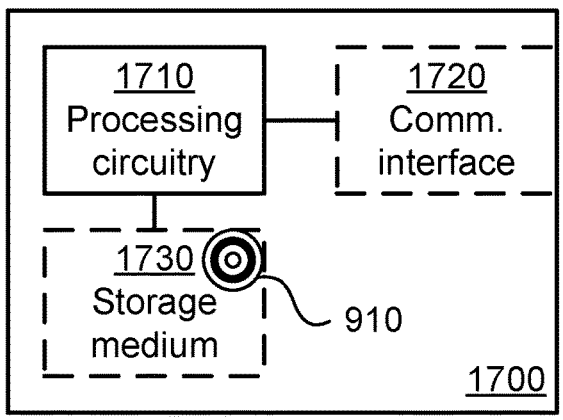
FIG. 17 is a schematic diagram showing functional units of a DPD according to an embodiment.

FIG. 17 schematically illustrates, in terms of a number of functional units, the components of a DPD 1700 according to an embodiment. Processing circuitry 1710 is provided using any combination of one or more of a suitable central processing unit (CPU), multiprocessor, microcontroller, digital signal processor (DSP), etc., capable of executing software instructions stored in a computer program product 1910 (as in FIG. 19), e.g. in the form of a storage medium 1730. The processing circuitry 1710 may further be provided as at least one application specific integrated circuit (ASIC), or field programmable gate array (FPGA).

Particularly, the processing circuitry 1710 is configured to cause the DPD 1700 to perform a set of operations, or steps, as disclosed above. For example, the storage medium 1730 may store the set of operations, and the processing circuitry 1710 may be configured to retrieve the set of operations from the storage medium 1730 to cause the DPD 1700 to perform the set of operations. The set of operations may be provided as a set of executable instructions.

Thus the processing circuitry 1710 is thereby arranged to execute methods as herein disclosed. The storage medium 1730 may also comprise persistent storage, which, for example, can be any single one or combination of magnetic memory, optical memory, solid state memory or even remotely mounted memory. The DPD 1700 may further comprise a communications interface 1720 at least configured for communications with other entities, functions, nodes, and devices, as illustrated in some of the figures. As such the communications interface 1720 may comprise one or more transmitters and receivers, comprising analogue and digital components. The processing circuitry 1710 controls the general operation of the DPD 1700 e.g. by sending data and control signals to the communications interface 1720 and the storage medium 1730, by receiving data and reports from the communications interface 1720, and by retrieving data and instructions from the storage medium 1730. Other components, as well as the related functionality, of the DPD 1700 are omitted in order not to obscure the concepts presented herein.

Figure 18:
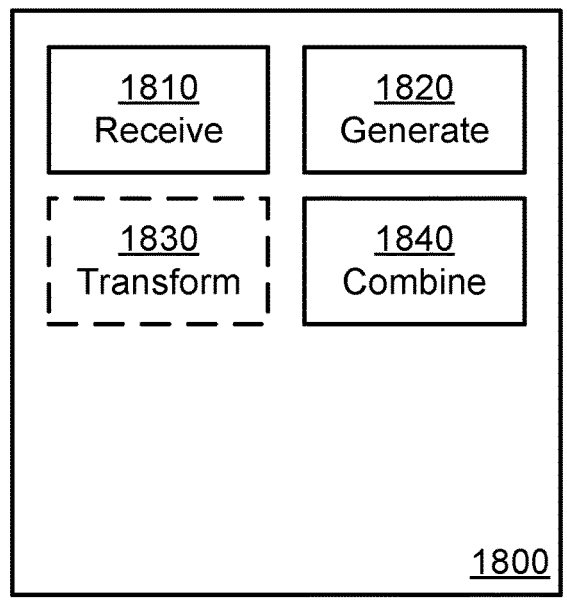
FIG. 18 is a schematic diagram showing functional modules of a DPD according to an embodiment.

FIG. 18 schematically illustrates, in terms of a number of functional modules, the components of a DPD 1800 according to an embodiment. The DPD 1800 of FIG. 18 comprises a number of functional modules; a receive module 1810 configured to perform step S102, a generate module 1820 configured to perform step S104-l, and a combine module 1840 configured to perform step S106-l. The DPD 1800 of FIG. 18 may further comprise a number of optional functional modules, such as a transform module 1830 configured to perform step S104a-l. In general terms, each functional module 1810:1840 may in one embodiment be implemented only in hardware and in another embodiment with the help of software, i.e., the latter embodiment having computer program instructions stored on the storage medium 1730 which when run on the processing circuitry makes the DPD 1700 perform the corresponding steps mentioned above in conjunction with FIG. 18. It should also be mentioned that even though the modules correspond to parts of a computer program, they do not need to be separate modules therein, but the way in which they are implemented in software is dependent on the programming language used. Preferably, one or more or all functional modules 1810:1840 may be implemented by the processing circuitry 1710, possibly in cooperation with the communications interface 1720 and/or the storage medium 1730. The processing circuitry 1710 may thus be configured to from the storage medium 1730 fetch instructions as provided by a functional module 1810:

1840 and to execute these instructions, thereby performing any steps as disclosed herein.

The DPD 1700, 1800 may be provided as a standalone device or as a part of at least one further device. For example, the DPD 1700, 1800 may be provided in a node of an access network Alternatively, functionality of the DPD 1700, 1800 may be distributed between at least two devices, or nodes. These at least two nodes, or devices, may either be part of the same network part (such as a radio access network or a core network) or may be spread between at least two such network parts. Thus, a first portion of the instructions performed by the DPD 1700, 1800 may be executed in a first device, and a second portion of the of the instructions performed by the DPD 1700, 1800 may be executed in a second device; the herein disclosed embodiments are not limited to any particular number of devices on which the instructions performed by the DPD 1700, 1800 may be executed. Hence, the methods according to the herein disclosed embodiments are suitable to be performed by a DPD 1700, 1800 residing in a cloud computational environment. Therefore, although a single processing circuitry 1710 is illustrated in FIG. 17 the processing circuitry 1710 may be distributed among a plurality of devices, or nodes. The same applies to the functional modules 1810: 1840 of FIG. 18 and the computer program 1920 of FIG. 19.

Figure 19:
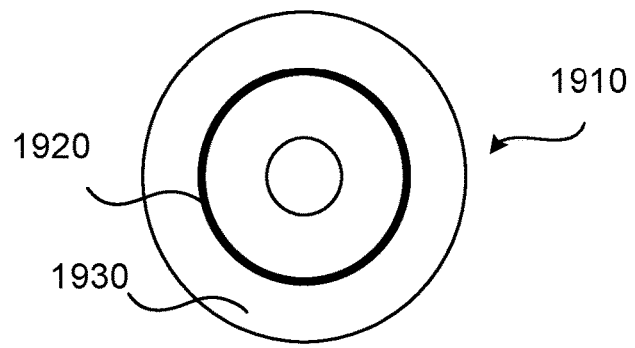
FIG. 19 shows one example of a computer program product comprising computer readable storage medium according to an embodiment.

FIG. 19 shows one example of a computer program product 1910 comprising computer readable storage medium 1930. On this computer readable storage medium 1930, a computer program 1920 can be stored, which computer program 1920 can cause the processing circuitry 1710 and thereto operatively coupled entities and devices, such as the communications interface 1720 and the storage medium 1730, to execute methods according to embodiments described herein. The computer program 1920 and/or computer program product 1910 may thus provide means for performing any steps as herein disclosed.

In the example of FIG. 19, the computer program product 1910 is illustrated as an optical disc, such as a CD (compact disc) or a DVD (digital versatile disc) or a Blu-Ray disc. The computer program product 1910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1920 is here schematically shown as a track on the depicted optical disk, the computer program 1920 can be stored in any way which is suitable for the computer program product 1910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for operating a digital pre-distorter, (DPD) for an access node, the method comprising:
   receiving a plurality of input signals, each from a respective frequency band, wherein each signal is of memory order M;
   for each frequency band l=1, . . . , B of the frequency bands:
   generating a plurality of pre-distorted signals for the frequency band l based on the plurality of input signals coming from all the B frequency bands and using Look-Up Tables (LUTs) according to which there is one LUT structure with LUT-based transforms per each combination of frequency band l=1, . . . , B and memory order m=0, . . . , M, wherein each of the LUT structures comprises combinations of LUTs of at most dimension B−q, where 1≤q<B; and
   combining the plurality of pre-distorted signals for the frequency band to provide a combined pre-distorted signal for the frequency band.

2. The method of claim 1, wherein address entries of the LUTs are determined using a basis function $\tilde{S}$ operating on B−q-dimensional inputs of the plurality of input signals, and wherein there is one LUT for all terms in $\tilde{S}$ with same address entry and different LUTs for all terms in $\tilde{S}$ with different address entries.

3. The method of claim 1, wherein the LUT-based transforms have adapted DPD coefficients β.

4. The method of claim 3, wherein adapted DPD coefficients β are determined through training of the DPD with reference signals.

5. The method of claim 1, wherein each dimension represents a respective address entry to the LUTs.

6. The method of claim 1, wherein generating the plurality of pre-distorted signals comprises:
   transforming the plurality of input signals coming from all the B frequency bands using the LUT-based transforms, wherein which of the LUT-based transforms to use for transforming the plurality of input signals are determined by using the plurality of input signals as input to the LUTs.

7. The method of claim 1, wherein the LUT structures for frequency band l and memory order m comprises a first set of LUTs adapted to use as input a one-dimensional input formed by the plurality of input signals from a respective individual frequency band of the B frequency bands.

8. The method of claim 7, wherein the LUT-based transforms of the LUTs in the first set of LUTs for frequency band l at time index n for transforming input signal x are denoted $H_l^{(i)}(x,n)$ and defined as:

$$H_l^{(i)}(x, n) = \left(\beta_{l,m}^{(i)} + \sum_{b=1}^{B}\sum_{p=1}^{P-1} \beta_{l,m,p,b}^{(i)} |x_b(n - Q_m)|^p\right).$$

9. The method of claim 1, wherein the LUT structures for frequency band l and memory order m comprises a second set of LUTs adapted to use as input B−q down to 2-dimensional input formed by combinations of B−q of the frequency bands down to 2 of the frequency bands, where q>B−1.

10. The method of claim 9, wherein the LUT-based transforms of the LUTs in the second set of LUTs for frequency band B−r, for r={q, q+1, . . . , B−2}, at time index n for transforming input signal x are denoted $H_l^{(B-r)}(x,n)$ and defined as:

$$H_l^{(B-r)}(x, n) = \sum_{k=1}^{\binom{B}{B-r}}\sum_{p_1=1}^{P-1}\sum_{p_2=1}^{P_1} \cdots \sum_{p_{B-r}=1}^{p_{B-r-1}} \beta_{l,m,k,p_1,p_2,\ldots,p_{B-r}}^{(B-r)}$$

$$\prod_{b \in i_k} |x_b(n - Q_m)|^{(p_b - p_{b+1})}.$$

11. The method of claim 1, wherein the LUT structures for frequency band l and memory order m comprises a third set of LUTs adapted to use as input a one-dimensional input formed by weighted linear combinations of the plurality of input signals from all B frequency bands.

12. The method of claim 11, wherein the LUT-based transforms of the t:th LUT in the third set of LUTs when q>B−1 at time index n for transforming input signal x are denoted $H_l^{(wsm,t)}(x,n)$ and defined as:

$$H_l^{(wsm,t)}(x, n) = \sum_{p=B}^{P-1} \beta_{l,m,p}^{(wsm,t)} \left( \sum_{b=1}^{B} w_b^{(t)} |x_b(n - Q_m)| \right)^p.$$

13. The method of claim 11, wherein the LUT-based transforms of the LUTs in the third set of LUTs for frequency band B−r at time index n for transforming input signal x when q=B−1 are denoted $H_l^{(B-r,wsm,t_{B-r})}(x,n)$ and defined as:

$$H_l^{(B-r,wsm,t_{B-r})}(x, n) = \sum_{k=1}^{\binom{B}{B-r}} \sum_{p=1}^{P-1} \beta_{l,m,k,p}^{(B-r,wsm,t_{B-r})} \left( \sum_{b \in i_k} w_b^{(t_{B-r})} |x_b(n - Q_m)| \right)^p.$$

14. The method of claim 11, wherein the weighted linear combinations of the plurality of input signals are weighted using weights $w_b^{(t)}$, $w_b^{(t_{B-r})}$.

15. The method of claim 14, wherein the weights $w_b^{(t)}$ are iteratively determined.

16. The method of claim 1, wherein the LUTs have adapted grid points, the grid points being identified using parameter estimation.

17. The method of claim 1, wherein only a subset of all available LUTs are used when generating the plurality of pre-distorted signals, and wherein which LUTs to be included in the subset of LUTs is determined by empirical analysis.

18. The method of claim 1, where q=B−1.

19. A digital pre-distorter, (DPD) for an access node, the DPD comprising processing circuitry, the processing circuitry being configured to cause the DPD to:
receive a plurality of input signals, each from a respective frequency band, wherein each signal is of memory order M;
for each frequency band l=1, . . . , B of the frequency bands:
generate a plurality of pre-distorted signals for the frequency band l based on the plurality of input signals coming from all the B frequency bands and using Look-Up Tables, LUTs, according to which there is one LUT structure with LUT-based transforms per each combination of frequency band l=1, . . . , B and memory order m=0, . . . , M, wherein each of the LUT structures comprises combinations of LUTs of at most dimension B−q, where 1≤q<B; and
combine the plurality of pre-distorted signals for the frequency band to provide a combined pre-distorted signal for the frequency band.

20. A non-transitory computer readable storage medium storing a computer program for operating a digital pre-distorter (DPD) for an access node, the computer program comprising computer code which, when run on processing circuitry of the DPD, causes the DPD to:
receive a plurality of input signals, each from a respective frequency band, wherein each signal is of memory order M;
for each frequency band l=1, . . . , B of the frequency bands:
generate a plurality of pre-distorted signals for the frequency band l based on the plurality of input signals coming from all the B frequency bands and using Look-Up Tables, LUTs, according to which there is one LUT structure with LUT-based transforms per each combination of frequency band l=1, . . . , B and memory order m=0, . . . , M, wherein each of the LUT structures comprises combinations of LUTs of at most dimension B−q, where 1≤q<B; and
combine the plurality of pre-distorted signals for the frequency band to provide a combined pre-distorted signal for the frequency band.

\* \* \* \* \*